United States Patent
Pechanek et al.

(10) Patent No.: US 6,408,382 B1
(45) Date of Patent: Jun. 18, 2002

(54) METHODS AND APPARATUS FOR ABBREVIATED INSTRUCTION SETS ADAPTABLE TO CONFIGURABLE PROCESSOR ARCHITECTURE

(75) Inventors: Gerald G. Pechanek, Cary; Charles W. Kurak, Jr., Durham; Larry D. Larsen, Raleigh, all of NC (US)

(73) Assignee: Bops, Inc., Chapel Hill, NC (US)

( * ) Notice: Subject to any disclaimer, the term of this patent is extended or adjusted under 35 U.S.C. 154(b) by 0 days.

(21) Appl. No.: 09/422,015

(22) Filed: Oct. 21, 1999

(51) Int. Cl.[7] .................................................. G06F 9/45
(52) U.S. Cl. ........................... 712/227; 341/55; 707/5; 712/200
(58) Field of Search ................................. 712/200, 227; 707/5; 341/55

(56) References Cited

U.S. PATENT DOCUMENTS

| | | | |
|---|---|---|---|
| 4,722,050 A | 1/1988 | Lee et al. .................... 712/205 |
| 4,965,771 A | 10/1990 | Morikawa et al. .......... 358/1.13 |
| 5,632,028 A | 5/1997 | Thusoo et al. ................ 703/26 |
| 5,784,585 A | * 7/1998 | Denman ..................... 712/209 |
| 5,819,058 A | * 10/1998 | Miller et al. ................ 712/210 |
| 5,835,746 A | 11/1998 | Girardeau, Jr. et al. ..... 712/215 |
| 5,896,519 A | * 4/1999 | Worrell ....................... 712/213 |
| 5,898,883 A | 4/1999 | Fujii et al. .................... 712/28 |
| 5,909,587 A | 6/1999 | Tran .............................. 712/1 |
| 6,044,450 A | * 3/2000 | Tsushima et al. ............. 712/24 |
| 6,049,862 A | * 4/2000 | Bauer et al. ................ 712/208 |

FOREIGN PATENT DOCUMENTS

EP  0-820006 A2  7/1997
JP  09-265397 A  10/1997

* cited by examiner

Primary Examiner—Kenneth S. Kim
(74) Attorney, Agent, or Firm—Priest & Goldstein, PLLC

(57) ABSTRACT

An improved manifold array (ManArray) architecture addresses the problem of configurable application-specific instruction set optimization and instruction memory reduction using an instruction abbreviation process thereby further optimizing the general ManArray architecture for application to high-volume and portable battery-powered type of products.

In the ManArray abbreviation process a standard 32-bit ManArray instruction is reduced to a smaller length instruction format, such as 14-bits. An application is first programmed using the full ManArray instruction set using the native 32-bit instructions. After the application program is completed and verified, an instruction-abbreviation tool analyzes the 32-bit application program and generates the abbreviated program using the abbreviated instructions. This instruction abbreviation process allows different program-reduction optimizations tailored for each application program. This process develops an optimized instruction set for the intended application. The abbreviated program, now located in a significantly smaller instruction memory, is functionally equivalent to the original native 32-bit application program. The abbreviated-instructions are fetched from this smaller memory and then dynamically translated into native ManArray instruction form in a sequence processor controller. Since the instruction set is now determined for the specific application, an optimized processor design can be easily produced. The system and process can be applied to native instructions having other numbers of bits and to other processing architectures.

43 Claims, 20 Drawing Sheets

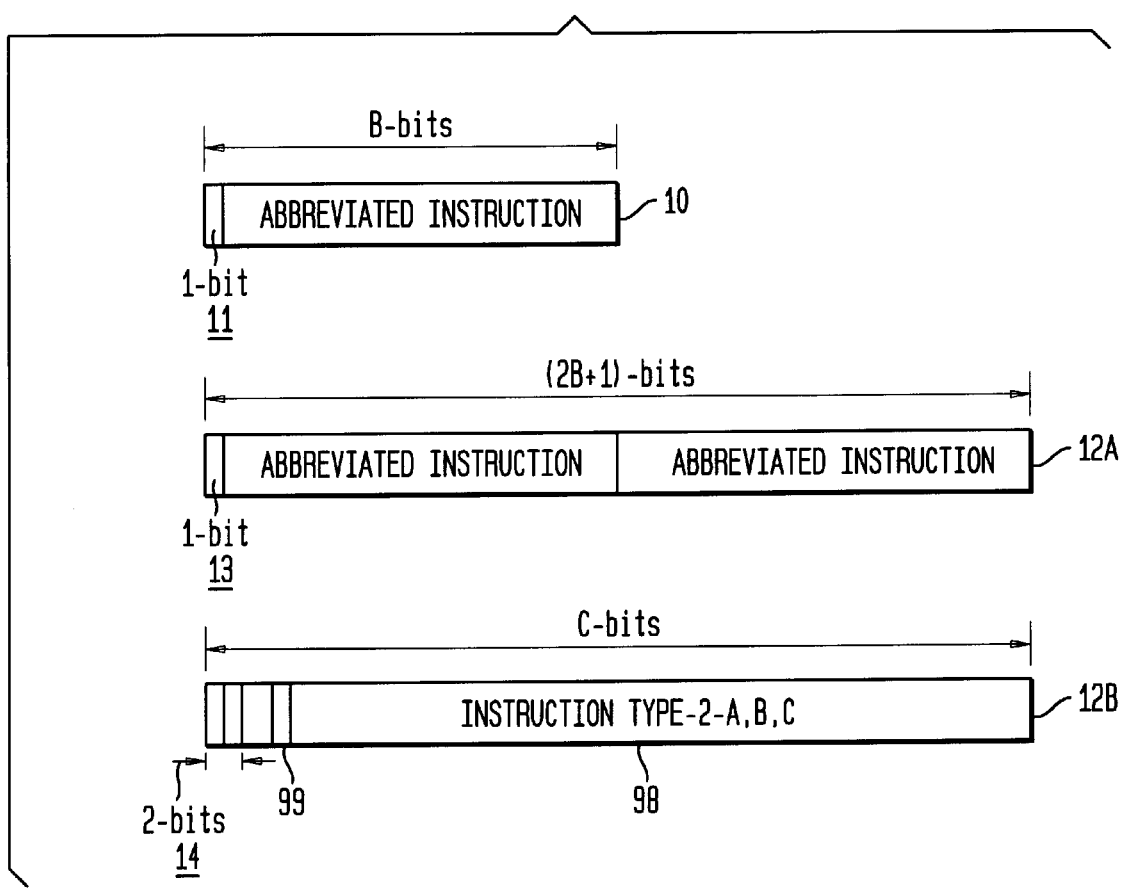

FIG. 6B

| 13 | 12 | 11 | 10 | 9 | 8 | 7 | 6 | 5 | 4 | 3 | 2 | 1 | 0 |
|---|---|---|---|---|---|---|---|---|---|---|---|---|---|
| S/P | XV iVLIW 111 | | | 4-BIT TM2Offs Vb=V0 | | | | 6-BIT TM1Offs Vb=V0 | | | | | |

652 — XV iVLIW 111
656 — 4-BIT TM2Offs Vb=V0
654 — 6-BIT TM1Offs Vb=V0
650

FIG. 10

| CYCLE | FETCH | Xpand & Dispatch | Decode | Execute | Cond. Ret |
|---|---|---|---|---|---|
| i | SP Fetches a B-bit Instr(i)=ADD.S instruction & loads it into IR1 | Previous Instruction Instr(i-1) | Previous Instruction Instr(i-2) | Previous Instruction Instr(i-3) | Previous Instruction Instr(i-4) |
| i+1 | SP Fetches a B-bit Instr(i+1)=XV.S instruction & loads it into IR1 | S/P-bit indicates an SP only operation. Local TM fetches occur and a native form of the Instr(i)=ADD.S instruction is loaded into IR2. The S/P-bit and 3-bit opcode are decoded in the S/P. | Previous Instruction Instr(i-1) | Previous Instruction Instr(i-2) | Previous Instruction Instr(i-3) |
| i+2 | SP Fetches a B-bit Instr(i+2)=COPY.S instruction & loads it into IR1 | S/P-bit opcode indicate an SP XV operation. Local TM fetches occur and a native form of the Instr(i+1)=XV.S instruction is loaded into IR2. The S/P-bit, and 3-bit opcode are decoded in the S/P. The VIM address is calculated and the iVLIW is fetched from the XV VIM | The ALU decodes Instr(i)=ADD.S instruction | Previous Instruction Instr(i-1) | Previous Instruction Instr(i-2) |
| i+3 | SP Fetches a B-bit Instr(i+3)=ADD.S instruction & loads it into IR1 | S/P-bit indicates an SP only operation. Local TM fetches occur and a native form of the Instr(i+2)=COPY.S instruction is loaded into IR2 | Instr(i+1)=XV.S causes up to 5 instructions in iVLIW decode | The ALU executes Instr(i)=ADD.S instruction | Previous Instruction Instr(i-1) |
| i+4 | SP Fetches a B-bit instruction: Instr(i+4) | S/P-bit indicates an SP only operation. Local TM fetches occur and a native form of the Instr(i+3)=ADD.S instruction is loaded into IR2 | The DSU decodes the Instr(i+2)=COPY.S instruction | Instr(i+1)=XV.S causes up to 5 instructions in iVLIW execute | Instr(i+1)=ADD.S side effects are set in ASFs and ACFs |

METHODS AND APPARATUS FOR ABBREVIATED INSTRUCTION SETS ADAPTABLE TO CONFIGURABLE PROCESSOR ARCHITECTURE

FIELD OF THE INVENTION

The present invention relates generally to improved methods and apparatus for providing abbreviated instructions, mechanisms for translating abbreviated instructions, and configurable processor architectures for system-on-silicon embedded processors.

BACKGROUND OF THE INVENTION

An emerging class of embedded systems, especially those for portable systems, is required to achieve extremely high performance for the intended application, to have a small silicon area with a concomitant low price, and to operate with very low power requirements. Meeting these sometimes opposing requirements is a difficult task, especially when it is also desirable to maintain a common single architecture and common tools across multiple application domains. This is especially true in a scalable array processor environment. The difficulty of the task has prevented a general solution resulting in a multitude of designs being developed, each optimized for a particular application or specialized tasks within an application. For example, high performance 3D graphics for desktop personal computers or AC-powered game machines are not concerned with limiting power, nor necessarily maintaining a common architecture and set of tools across multiple diverse products. In other examples, such as portable battery powered products, great emphasis is placed on power reduction and providing only enough hardware performance to meet the basic competitive requirements. The presently prevailing view is that it is not clear that these seemingly opposing requirements can be met in a single architecture with a common set of tools.

In order to meet these opposing requirements, it is necessary to develop a processor architecture and apparatus that can be configured in more optimal ways to meet the requirements of the intended task. One prior art approach for configurable processor designs uses field programmable gate array (FPGA) technology to allow software-based processor optimizations of specific functions. A critical problem with this FPGA approach is that standard designs for high performance execution units require ten times the chip area or more to implement in a FPGA than would be utilized in a typical standard application specific integrated circuit (ASIC) design. Rather than use a costly FPGA approach for a configurable processor design, the present invention uses a standard ASIC process to provide software-configurable processor designs optimized for an application. The present invention allows for a dynamically configurable processor for low volume and development evaluations while also allowing optimized configurations to be developed for high volume applications with low cost and low power using a single common architecture and tool set.

Another aspect of low cost and low power embedded cores is the characteristic code density a processor achieves in an application. The greater the code density the smaller the instruction memory can be and consequently the lower the cost and power. A standard prior art approach to achieving greater code density is to use two instruction formats with one format half the size of the other format. Both of these different format types of instructions can be executed in the processor. though many times a mode bit is used to indicate which format type instruction can be executed. With this prior art approach, there typically is a limitation placed upon the reduced instructions which is caused by the reduced format size. For example, the number of registers visible to the programmer using a reduced instruction format is frequently restricted to only 8 or 16 registers when the full instruction format supports up to 32 or more registers. These and other compromises of a reduced instruction format are eliminated with this present invention as addressed further below.

Thus, it is recognized that it will be highly advantageous to have a scalable processor family of embedded cores based on a single architecture model that uses common tools to support software-configurable processor designs optimized for performance, power, and price across multiple types of applications using standard ASIC processes as discussed further below.

SUMMARY OF THE INVENTION

In one embodiment of the present invention, a manifold array (ManArray) architecture is adapted to employ various aspects of the present invention to solve the problem of configurable application-specific instruction set optimization and program size reduction, thereby increasing code density and making the general ManArray architecture even more desirable for high-volume and portable battery-powered types of products. The present invention extends the pluggable instruction set capability of the ManArray architecture described in U.S. application Ser. No. 09/215,081 filed Dec. 18, 1998, now U.S. Pat. No. 6,101,592, entitled "Methods and Apparatus for Scalable Instruction Set Architecture with Dynamic Compact Instructions" with new approaches to program code reduction and stand-alone operation using only abbreviated instructions in a manner not previously described.

In the ManArray instruction abbreviation process in accordance with the present invention, a program is analyzed and the standard 32-bit ManArray instructions are replaced with abbreviated instructions using a smaller length instruction format, such as 14-bits, custom tailored to the analyzed program. Specifically, this process begins with programming an application with the full ManArray architecture using the native 32-bit instructions and standard tools. After the application program is completed and verified, or in an iterative development process, an instruction-abbreviation tool analyzes the 32-bit ManArray application program and generates the application program using abbreviated instructions. This instruction-abbreviation process creates different program code size optimizations tailored for each application program. Also, the process develops an optimized abbreviated instruction set for the intended application. Since all the ManArray instructions can be abbreviated, instruction memory can be reduced, and smaller custom tailored cores produced. Consequently, it is not necessary to choose a fixed subset of the full ManArray instruction set architecture for a reduced instruction format size, with attendant compromises, to improve code density.

Depending upon the application requirements, certain rules may be specified to guide the initial full 32-bit code development to better optimize the abbreviation process, and the performance, size, and power of the resultant embedded processor. Using these rules, the reduced abbreviated-instruction program, now located in a significantly smaller instruction memory, is functionally equivalent to the original application program developed with the 32-bit instruction set architecture. In the ManArray array processor, the abbreviated instructions are fetched from this smaller memory and then dynamically translated into native ManArray instruction form in a sequence processor array controller. If after translation the instruction is determined to be a processing element (PE) instruction, it is dispatched to the PEs for execution. The PEs do not require a translation mechanism.

For each application, the abbreviation process reduces the instruction memory size and allows reduced-size execution units, reduced-size register files, and other reductions to be evaluated and if determined to be effective to thereby specify a uniquely optimized processor design for each application. Consequently, the resultant processor designs have been configured for their application.

A number of abbreviated-instruction translation techniques are demonstrated for the present invention where translation, in this context, means to change from one instruction format into another. The translation mechanisms are based upon a number of observations of instruction usage in programs. One of these observations is that in a static analysis of many programs not all instructions used in the program are unique. There is some repetition of instruction usage that varies from program to program. Using this knowledge, a translation mechanism for the unique instructions in a program is provided to reduce the redundant usage of the common instructions. Another observation is that in a static analysis of a program's instructions it is noticed that for large groups of instructions many of the bits in the instruction format do not change. One method of classifying the groups is by opcode, for example, arithmetic logic unit (ALU) and load instructions represent two opcode groupings of instructions. It is further recognized that within opcode groups there are many times patterns of bits that do not change within the group of instructions. Using this knowledge, the concept of instruction styles is created. An instruction style as utilized herein represents a specific pattern of bits of the instruction format that is constant for a group of instructions in a specific program, but that can be different for any program analyzed. A number of interesting approaches and variations for translation emerge from these understandings. In one approach, a translation memory is used with a particular style pattern of bits encoded directly into the abbreviated-instruction format. In another approach, all the style bit patterns or style-field are stored in translation memories and the abbreviated-instruction format provides the mechanism to access the style bit patterns. With the style patterns stored in memory, the translation process actually consists of constructing the native instruction format from one or more stored patterns. It was found in a number of exemplary cases that the program stored in main instruction memory can be reduced by more than 50% using these advantageous new techniques.

It is noted that the ManArray instruction set architecture while presently preferred is used herein only as illustrative as the present invention is applicable to other instruction set architectures.

These and other advantages of the present invention will be apparent from the drawings and the Detailed Description which follows.

BRIEF DESCRIPTION OF THE DRAWINGS

FIG. 1B illustrates a series of ManArray instruction set formats in accordance with the present invention;

FIG. 6B illustrates an exemplary 14-bit abbreviated XV iVLIW instruction format in accordance with the present invention;

FIG. 10 illustrates the operations performed in the five stage pipeline for five clock cycles for ADD.S, XV.S, COPY.S, ADD.S, and Instr (i+4) abbreviated-instructions in accordance with the present invention.

DETAILED DESCRIPTION

Further details of a presently preferred ManArray architecture for use in conjunction with the present invention are found in U.S. Pat. No. 6,023,753, U.S. Pat. No. 6,167,502, U.S. patent application Ser. No. 09/169,255 filed Oct. 9, 1998, U.S. Pat. No. 6,167,501, U.S. Pat. No. 6,219,776, U.S.

Pat. No. 6,151,668, U.S. Pat. No. 6,173,389, U.S. Pat. No. 6,101,592, U.S. Pat. No. 6,216,223, U.S. patent application Ser. No. 09/238,446 filed Jan. 28, 1999, U.S. patent application Ser. No. 09/267,570 filed Mar. 12, 1999, as well as, Provisional Application Serial No. 60/092,130 entitled "Methods and Apparatus for Instruction Addressing in Indirect VLIW Processors" filed Jul. 9, 1998, Provisional Application Serial No. 60/103,712 entitled "Efficient Complex Multiplication and Fast Fourier Transform (FFT) Implementation on the ManArray" filed Oct. 9, 1998, Provisional Application Serial No. 60/106,867 entitled "Methods and Apparatus for Improved Motion Estimation for Video Encoding" filed Nov. 3, 1998, Provisional Application Serial No. 60/113,637 entitled "Methods and Apparatus for Providing Direct Memory Access (DMA) Engine" filed Dec. 23, 1998, Provisional Application Serial No. 60/113,555 entitled "Methods and Apparatus Providing Transfer Control" filed Dec. 23, 1998, Provisional Application Serial No. 60/139,946 entitled "Methods and Apparatus for Data Dependent Address Operations and Efficient Variable Length Code Decoding in a VLIW Processor" filed Jun. 18, 1999, Provisional Application Serial No. 60/140,245 entitled "Methods and Apparatus for Generalized Event Detection and Action Specification in a Processor" filed Jun. 21, 1999, Provisional Application Serial No. 60/140,163 entitled "Methods and Apparatus for Improved Efficiency in Pipeline Simulation and Emulation" filed Jun. 21, 1999, Provisional Application Serial No. 60/140,162 entitled "Methods and Apparatus for Initiating and Re-Synchronizing Multi-Cycle SIMD Instructions" filed Jun. 21, 1999, Provisional Application Serial No. 60/140,244 entitled "Methods and Apparatus for Providing One-By-One Manifold Array (1×1 ManArray) Program Context Control" filed Jun. 21, 1999, Provisional Application Serial No. 60/140,325 entitled "Methods and Apparatus for Establishing Port Priority Function in a VLIW Processor" filed Jun. 21, 1999, and Provisional Application Serial No. 60/140,425 entitled "Methods and Apparatus for Parallel Processing Utilizing a Manifold Array (ManArray) Architecture and Instruction Syntax" filed Jun. 22, 1999 respectively, all of which are assigned to the assignee of the present invention and incorporated by reference herein in their entirety.

Figure 1A:
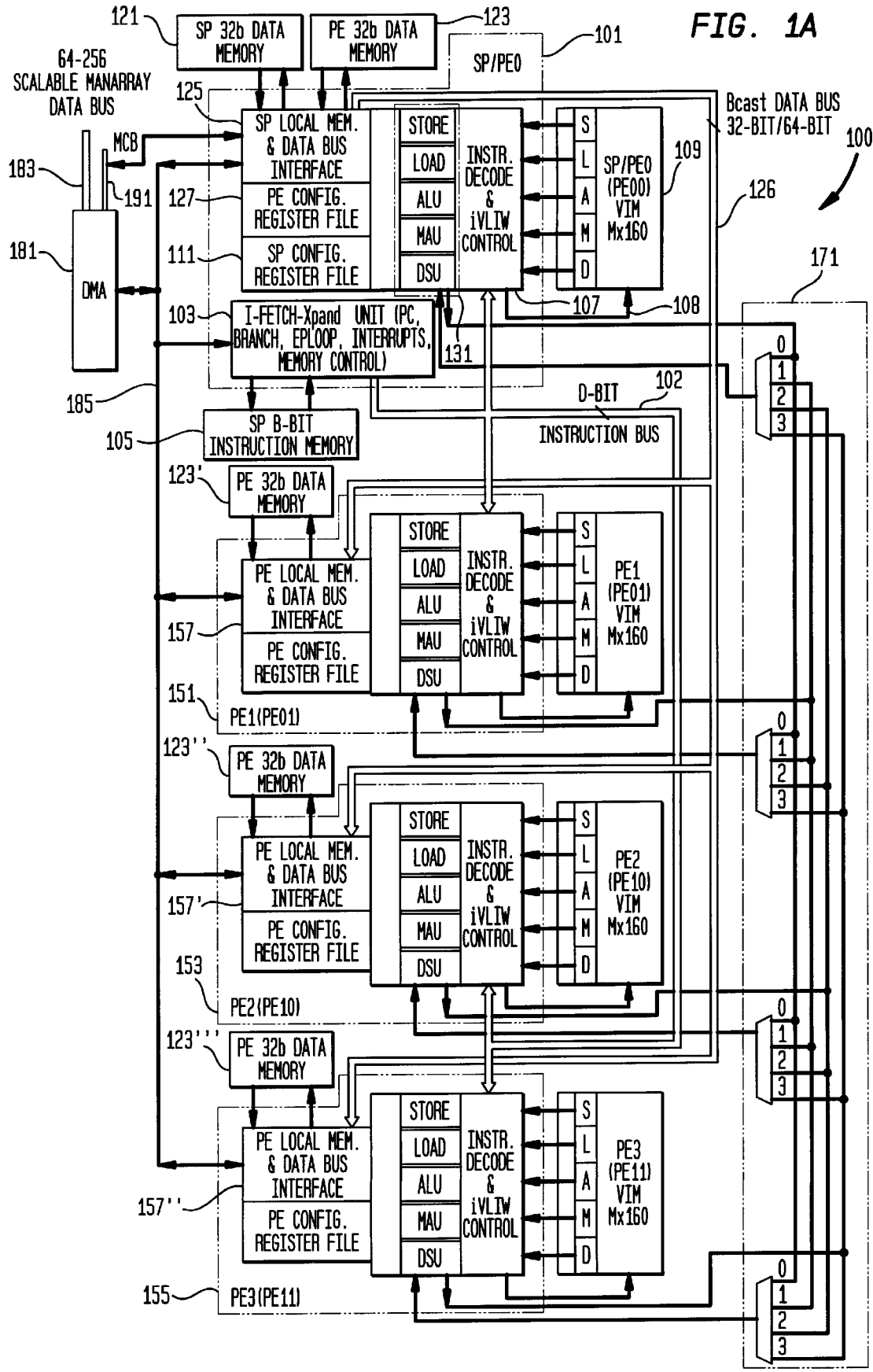
FIG. 1A illustrates an exemplary ManArray 2×2 iVLIW processor which can suitably be employed in conjunction with the present invention.

In a presently preferred embodiment of the present invention, a ManArray 2×2 iVLIW single instruction multiple data stream (SIMD) processor 100 as shown in FIG. 1A is used. Processor 100 comprises a sequence processor (SP) controller combined with processing element-0 (PE0) SP/PE0 101, as described in further detail in co-pending U.S. patent application Ser. No. 09/169,072, now U.S. Pat. No. 6,219,776, entitled "Methods and Apparatus for Dynamic Merging an Array Controller with an Array Processing Element" and filed Oct. 9, 1998. Three additional PEs 151, 153, and 155 are also utilized to demonstrate the abbreviated instruction and configurable processor architecture and apparatus. Note that the PEs can be also labeled with their matrix positions as shown in parentheses for PE0 (PE00) 101, PE1 (PE01)151, PE2 (PE10) 153, and PE3 (PE11) 155. The SP/PE0 101 contains a fetch controller 103 to allow the fetching of abbreviated-instruction words from a B-bit instruction memory 105, where B is determined by the application instruction-abbreviation process to be a reduced number of bits representing ManArray native instructions and/or to contain two or more abbreviated instructions as further described below. The fetch controller 103 provides the typical functions needed in a programmable processor, such as a program counter (PC), a branch capability, event point loop operations (for further details of such operation see U.S. Provisional Application Serial No. 60/140,245 entitled "Methods and Apparatus for Generalized Event Detection and Action Specification in a Processor" filed Jun. 21, 1999) and support for interrupts. Fetch controller 103 also provides instruction memory control which could include an instruction cache if needed by an application. The fetch controller 103 additionally provides the abbreviated-instruction translation apparatus described in the present invention. In addition, fetch controller 103 which may also be referred to as an instruction-fetch or I-fetch unit dispatches translated native instruction words and instruction control information to the other PEs in the system by means of a D-bit instruction bus 102. The D-bit instruction bus 102 may include additional control signals as needed in an abbreviated-instruction translation apparatus.

In this exemplary system 100 of FIG. 1A, common elements are used throughout to simplify the explanation, though actual implementations are not limited to this restriction. For example, the execution units 131 in the combined SP/PE0 101 can be separated into a set of execution units optimized for the control function with fixed point execution units in the SP, while PE0 as well as the other PEs can be optimized for a floating point application. For the purposes of the present description, it is assumed that the execution units 131 are of the same type in the SP/PE0 101 and the PEs 151, 152 and 153. In a similar manner, the SP/PE0 and the other PEs use a five instruction slot iVLIW architecture which contains a VLIW memory (VIM) 109 and an instruction decode and VIM controller function unit 107 which receives instructions as dispatched from the SP/PE0's I-fetch unit 103 and generates the VIM addresses and control signals 108 required to access the iVLIWs stored in the VIM. Store, load, arithmetic logic unit (ALU), multiply accumulate unit (MAU) and data select unit (DSU) instruction types are identified by the letters SLAMD in VIM 109 as follows store (S), load (L), ALU (A), MAU (M), and DSU (D).

The basic concept of loading the iVLIWs is described in further detail in co-pending U.S. patent application Ser. No. 09/187,539, now U.S. Pat. No. 6,151,668, entitled "Methods and Apparatus for Efficient Synchronous MIMD Operations with iVLIW PE-to-PE Communications" and filed Nov. 6, 1998. Also contained in the SP/PE0 and the other PEs is a common PE configurable register file (CRF) 127 which is described in further detail in co-pending U.S. patent application Ser. No. 09/169,255 entitled "Methods and Apparatus for Dynamic Instruction Controlled Reconfiguration Register File with Extended Precision" filed Oct. 9, 1998. Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is a cluster switch 171 which is more completely described in co-pending U.S. patent application Ser. Nos. 08/885,310 entitled "Manifold Array Processor" filed Jun. 30, 1997, now U.S. Pat. Nos. 6,023,753, 08/949, 122 entitled "Methods and Apparatus for Manifold Array Processing" filed Oct. 10, 1997, and 09/169,256 entitled "Methods and Apparatus for ManArray PE-to-PE Switch Control" filed Oct. 9, 1998, now U.S. Pat. No. 6,167,501. The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface symbolically represented by line 185. A high level view of a ManArray control bus (MCB) 191 is also shown in FIG. 1A.

FIG. 1B shows three instruction formats 10, 12A and 12B that are described in further detail for the ManArray abbreviated-instruction architecture in accordance with the present invention. The first instruction format 10 contains B-bits with a single bit 11 highlighted. The second format 12A encapsulates two smaller instruction formats, each B-bits in length. The third format 12B illustrates a single instruction of C-bits, which incorporates a special bit 99. In the description of the present invention which follows below C represents 32-bits and examples of B described herein are 12-bits, 13-bits, 14-bits, 15-bits, and 16-bits, although other sizes for B and C are not precluded. In all types of instruction formats for the ManArray array processor, a single bit 11, 13, and 99, is used to differentiate between SP instructions and PE instructions. This single bit is labeled the S/P-bit. In instruction format 12A, a single S/P-bit applies to both of the B-bit abbreviated instructions under the assumption that the majority of code will contain sequences of SP or PE instructions and usually not switch, instruction-by-instruction, between the SP and PEs. In the instruction format 12A, an additional bit P can be added to specify whether the two abbreviated instructions are to be executed in parallel, P=1, or sequentially, P=0. With parallel execution of two abbreviated instructions that do not have data dependencies between them, two sets of translation mechanisms operating in parallel are required. Alternatively, an additional bit can be added to provide each B-bit instruction in format 12A of FIG. 1B with its own S/P-bit.

In the instruction format 12B, bit 99 is the S/P bit. Two other bits 14 are hierarchy bits. Suitable instruction type-2-A,B,C formats 98 are described in further detail in U.S. patent application Ser. No. 09/215,081 entitled "Methods and Apparatus for Scalable Instruction Set Architecture with Dynamic Compact Instructions" and filed Dec. 18, 1998.

Figure 3A:
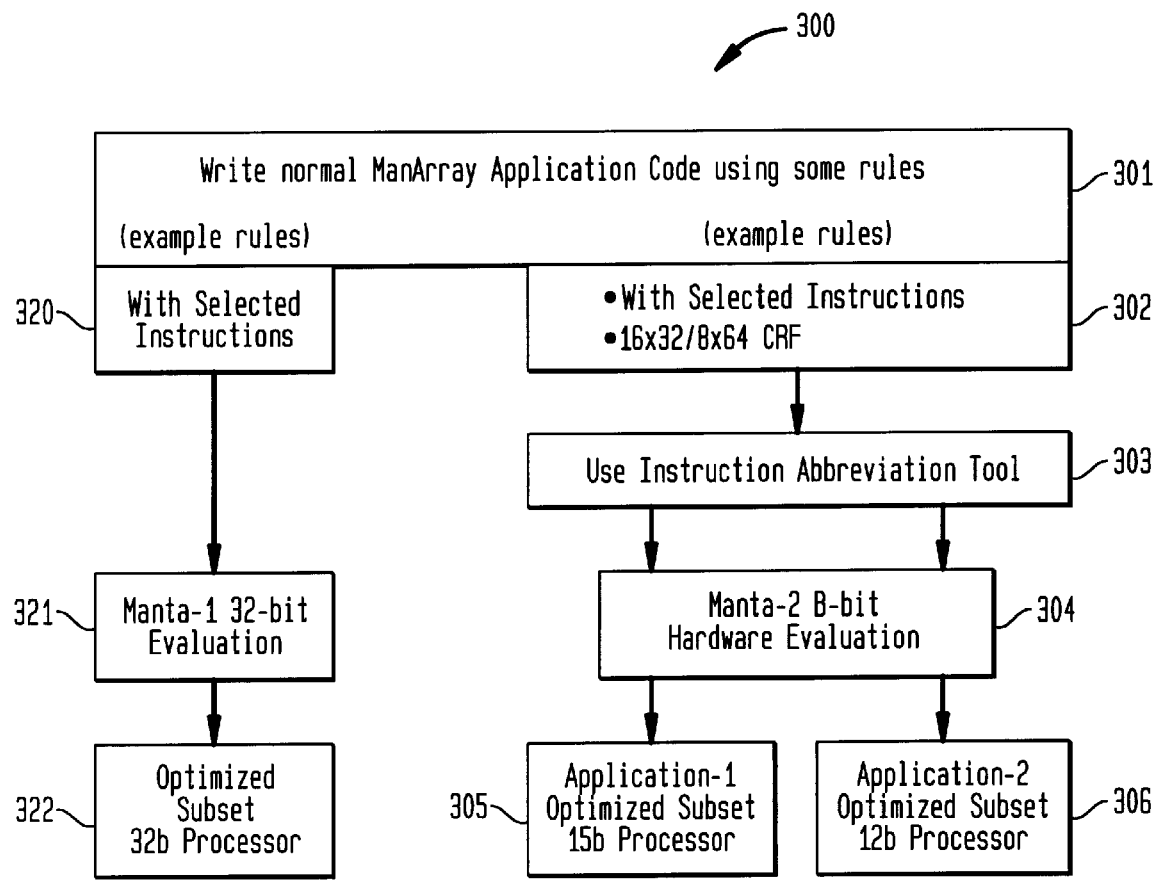
FIG. 3A illustrates a stream-flow development process in accordance with the present invention.

The ManArray abbreviated-instruction architecture of the present invention allows a programmer to write application code using the full ManArray architecture based upon the native instruction format 12B of FIG. 1B. A ManArray stream-flow process illustrated in FIG. 3A is then used to create abbreviated instructions of either format 10 of FIG. 1B in one implementation, or format 12A of FIG. 1B in another implementation, to fully represent the application code originally produced using instruction format 12B of FIG. 1B. The sub-setting nature of the ManArray abbreviated-instruction apparatus and tools provides the flexibility to reduce both the silicon area (price) and power for cost and power sensitive applications while not affecting performance. The flexibility offered by the ManArray digital signal processor (DSP) is fully available during the development phase with the full ManArray architecture and tools. Programmer flexibility to make changes to an abbreviated instruction program can be provided as required by a developer by providing additional abbreviated instruction memory space and translation capabilities greater than an embedded program's initial needs.

Figure 2:
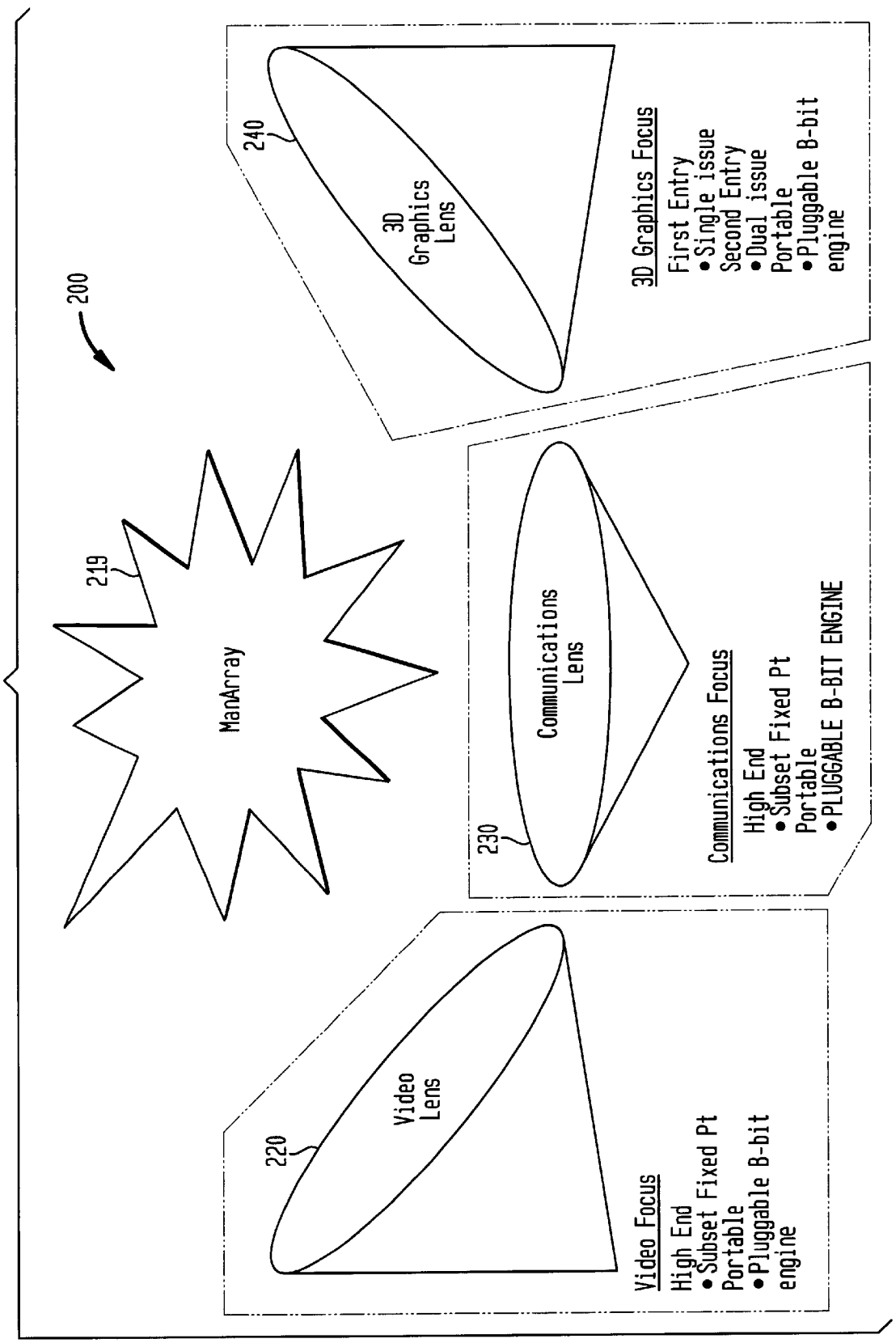
FIG. 2 illustrates, at a high level, the idea that the ManArray processor architecture can be focused on various applications showing focuses on three exemplary application-specific product areas as illustrative.

Thus, the ManArray abbreviated-instruction architecture allows maximum flexibility during development while providing an optimized-to-an-application core in final production. This multiple application focusing process 200 is illustrated in FIG. 2 where the ManArray architecture 219 is depicted as the starting point 301 for the stream-flow process 300 of FIG. 3A to focus the architecture on one of three intended applications 220, 230 or 240. A first application, video focus 220, comprises multiple fixed-point core products that encompass a range of high performance products with native ManArray instruction cores and portable products with B-bit abbreviated-instruction optimized cores. A second application, a communication focus 230 has a similar range, but the cores would be different than the video focus cores depending upon application needs. For example, in a portable cell phone application, the B-bit abbreviated-instruction core would contain execution units that execute a subset of the ManArray architecture appropriate for communication processing. This reduced size communication core would be different than the B-bit abbreviated-instruction core used in any of the video focus cores, but both would be optimized for their intended application. An exemplary third application, a 3D graphics focus 240, would use the full architecture potential but subset for floating point instructions in the PEs with the portable 3D graphics cores using an abbreviated-instruction core processor. The floating point cores could be divided into two entry core types: a first entry single-issue floating point core followed by a second entry dual-issue floating point core. The dual-issue floating point core would advantageously use dual single-precision floating point packed data types.

The ManArray instruction format 12B of FIG. 1B is now described further since it represents the presently preferred native application coding format and, as is described further below, represents the basis for the instruction format at the execution unit level. In format 12B, the 2-bit hierarchy field 14 identifies four functional groupings, each of which can contain different instruction formats depending upon the requirements for each group. With the 2-bit hierarchy field in C=32-bit instructions of format 12B, the specific operations in each group are defined within a 30-bit field. For a ManArray implementation, the four groups are preferably 00-reserved, 01-flow control, 10-load/store, and 11-arithmetic/logical(ALU/MAU/DSU). In FIG. 1B, an additional single bit field, bit 99 termed the S/P-bit, is used in a preferred embodiment of the present architecture to differentiate between the array-control SP instructions and the array PE instructions. If specific instructions cannot be executed in a PE, for example a branch instruction, then the bit is fixed in the controller SP-state. Alternatively, without using an S/P-bit, the flow control group could be defined to contain primarily SP instructions and have the determination of whether an instruction is an SP or a PE instruction be based upon a decode of that group's opcode field. For performance reasons and generality, the presently preferred ManArray implementation uses the S/P-bit on all instruction types in the three groups.

In this present implementation, when a non-iVLIW SP instruction is executed on the control processor, no PE instruction is executed. When a non-iVLIW PE instruction is executed, no SP control processor instruction is executed. This separation provides an easy logic-design control strategy for implementation and an intuitive programming model. For those instances where additional performance is required, the SP array controller merged with an array iVLIW PE such as merged unit 101 of FIG. 1A, allows SP SLAMD type instructions to be mixed with PE instructions in the same iVLIW with bit 99 used in each instruction in the VLIW to differentiate the mixed instructions.

Further aspects of the present invention are discussed in greater detail below. While 32-bit and now 64-bit architectures have dominated the field of high-performance computing in recent years, this domination has occurred at the expense of the size of the instruction memory subsystem. With the movement of digital signal processing (DSP) technology into multimedia and embedded systems markets, the cost of the processing subsystem, in many cases, has come to be dominated by the cost of memory and performance is often constrained by the access time of the local instruction memory associated with the DSP. Real-time issues impose further constraints, making it desirable to have time-critical applications in instruction memory with deterministic access time. This memory is preferably located on-chip. In a high volume embedded application, the full application code is embedded and many times stored in a read only memory (ROM) to further reduce costs. Since application code has been growing to accommodate more features and capabilities, the on-chip memory has been growing, further increasing its cost and affecting memory access timing. Consequently, the issue of code density becomes important to processor implementations.

The Manifold Array processor architecture and instruction set are adapted to address the code density and configurable processor optimization problem by utilizing the stream-flow process and abbreviated-instruction apparatus and tools in accordance with the present invention. The stream-flow process 300 is shown in FIG. 3A. In the development of a specific application, the standard ManArray software development kit (SDK) is used in step 301 with the application of some optional programmer/tool-supported rules as programming constraints listed in 302 and 320. These rules are chosen to improve the probability of creating smaller abbreviated programs than if no rules were used in the program development process. The rules are also chosen to aid in determining what instruction set choices are best suited to the intended application. For example, in a portable voice-only cell phone type of application, where power is of extreme importance and the performance requirements are low relative to the full ManArray capabilities, sample rules such as those indicated in step 302 might be used. One of these rules specifies a restricted use of the configurable register file (CRF), allowing the register file to be cut in half providing a 16×32 or an 8×64 configurable register file for a lower cost optimized processor core. Selected instructions can be eliminated from a programmer's choice, such as those specifically intended for MPEG Video type processing. Each of the rules describes a subset of the full ManArray architecture to be used and verified with tools that support this sub-setting.

After the application code is written using native instructions, an instruction-abbreviation tool is used in step 303 to analyze the ManArray native application code for common characteristic features of the code. These common characteristic features are specific bit-patterns within the instructions that are termed style-fields. These style-fields are used in conjunction with the abbreviated-instruction translation hardware to translate instructions as described herein. After the tool creates the application code in abbreviated-instruction form, the code can be run in step 304 on Manta-2 hardware capable of executing B-bit abbreviated instructions for evaluation purposes. In step 321 of FIG. 3A, a Manta-1 hardware evaluation unit is used where Manta-1 refers to a ManArray 2×2 processor with combined fixed and floating point execution units, implementing the majority of ManArray instructions, and having DMA capability. The Manta-2 processor possesses the same ManArray instruction execution capabilities as the Manta-1, but also has the ability to execute abbreviated instructions. The Manta-2 processor used in evaluation step 304 is a dynamically configurable processor for low volume and development evaluations.

Figure 3B:
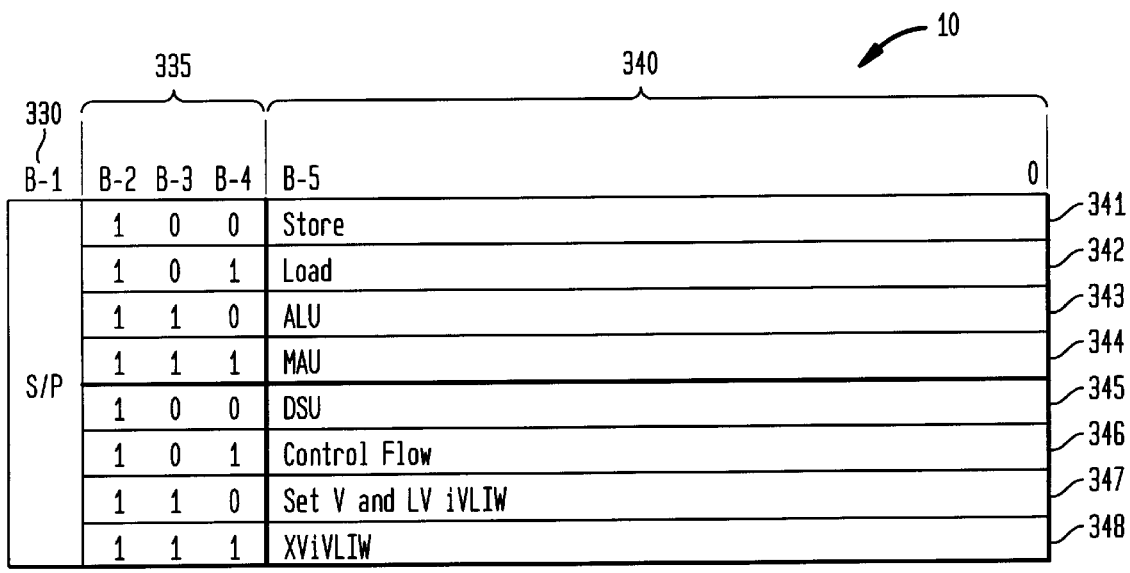
FIG. 3B illustrates a preferred encoding of ManArray B-bit abbreviated instructions in accordance with the present invention.
Figure 3C:
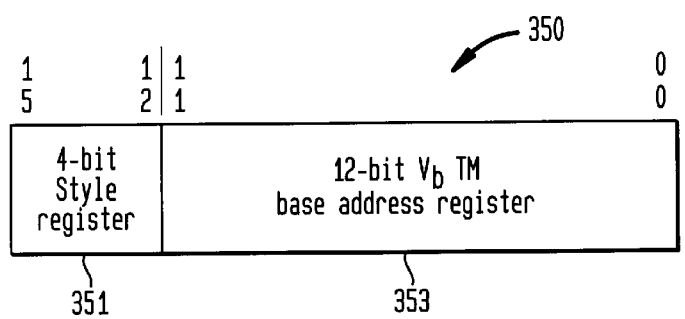
FIG. 3C illustrates a style register concatenated with a VIM base address register Vb in accordance with the present invention.
Figure 3D:
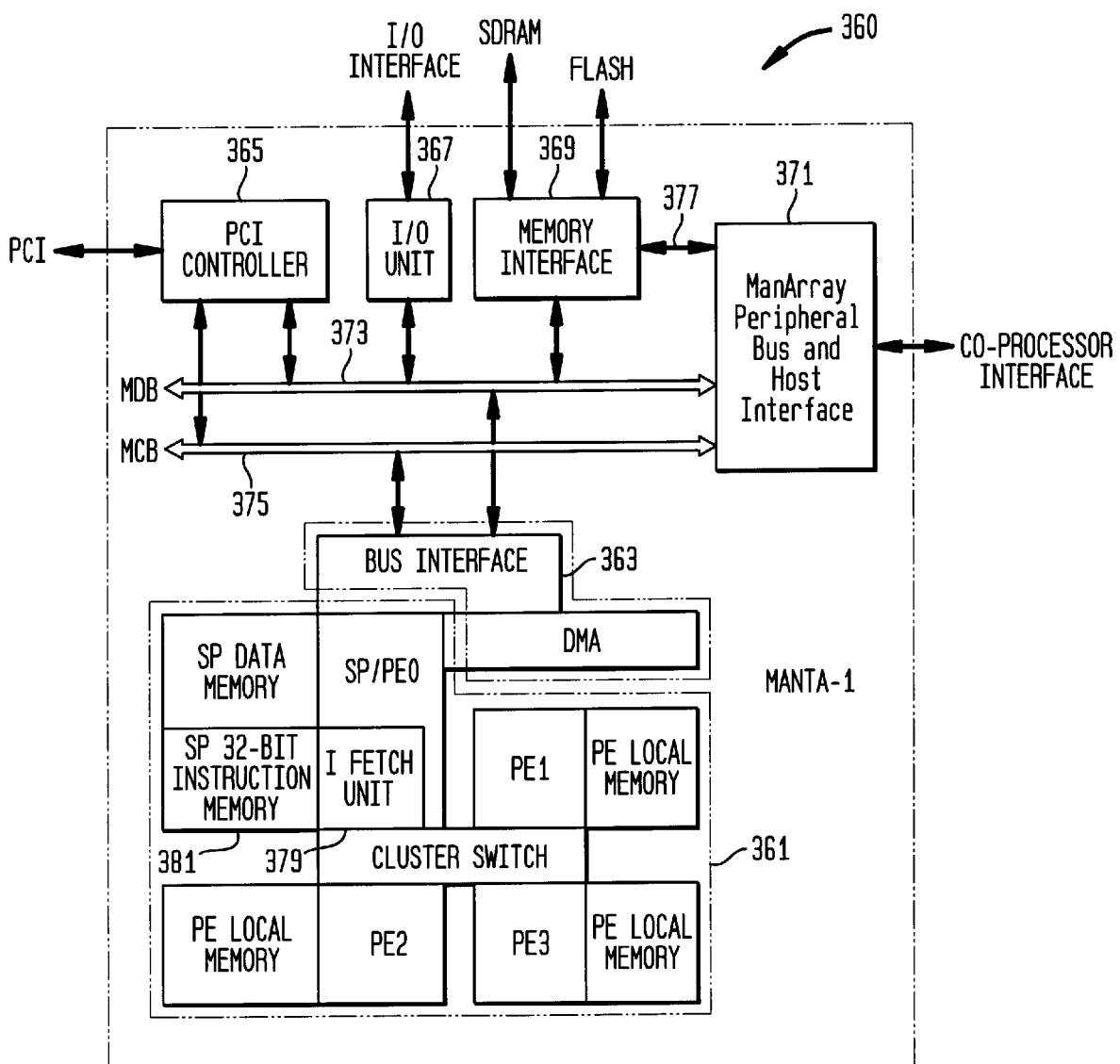
FIG. 3D illustrates a Manta-1 chip implementation of the ManArray architecture.

A Manta-1 chip implementation 360 of the ManArray architecture is shown in FIG. 3D. As presently defined, this implementation contains a 2×2 Manta DSP Core 361, including DMA and on-chip bus interfaces 363, a PCI controller 365, an input/output (I/O) unit 367, a 64-bit memory interface 369, and a ManArray peripheral bus (MPB) and host interface 371. This DSP is designed to be utilized as a coprocessor working alongside an X86, MIPS, ARM, or other host processor. The 2×2 ManArray core contains an I fetch unit 379 that interfaces with a 32-bit instruction memory 381. The 2×2 core attaches to the two main on-chip busses, the 32-bit ManArray control bus (MCB) 375 and the 64-bit ManArray data bus (MDB) 373 which is a scaleable bus allowing wider bus widths in different implementations depending upon a product's needs. The memory interface block 369 provides bulk memory (SDRAM) and non-volatile memory (FLASH read only memory) service via two busses, namely the MDB 373 and the private host memory port 377 from the host processor interface block 371. The ManArray peripheral bus is an off chip version of the internal ManArray busses and provides an interface to an ARM host processor. It is noted that the ManArray peripheral bus, in the present implementation, is shared with a host processor interface that is designed specifically to interface with a MIPS processor. The PCI controller 365 provides a standard X86 personal computer interface. The I/O block 367 internally contains a rudimentary I/O system for an embedded system, including, for example a debug UART interface, as well as MIPS host interface I/Os. These host I/Os include three 32-bit timers and an interrupt controller for the external host. Other chip support hardware such as debug and oscillator functions are not shown for clarity.

Figure 3E:
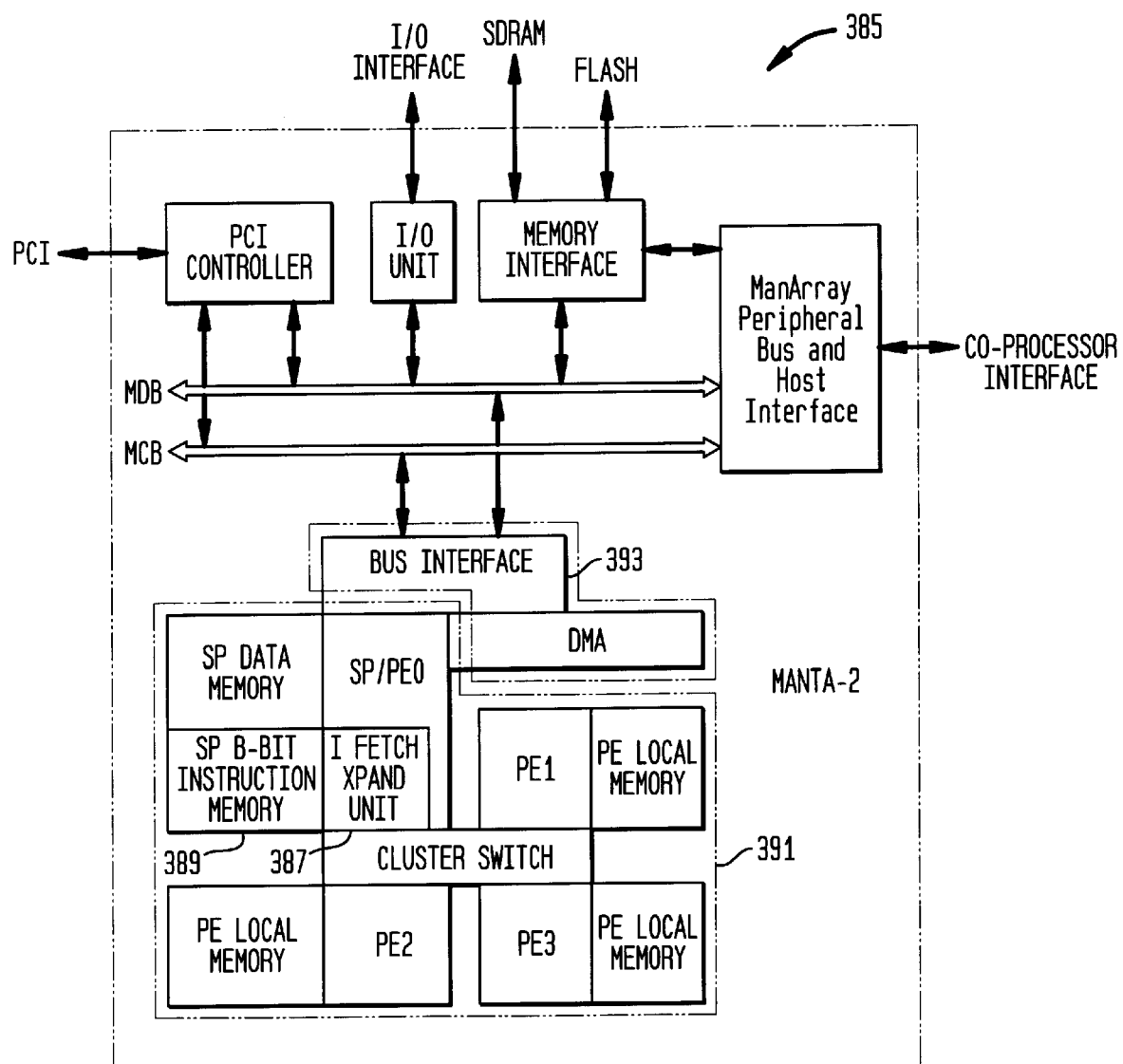
FIG. 3E illustrates a Manta-2 chip implementation of the ManArray architecture including instruction abbreviation in accordance with the present invention.

A Manta-2 chip implementation 385 of the ManArray architecture including instruction abbreviation in accordance with the present invention is shown in FIG. 3E. This implementation 385 contains equivalent functional units to those in the Manta-1 system of FIG. 3D except for support of the instruction abbreviation hardware and reduced B-bit size instruction memory. The 2×2 ManArray core 391 and DMA and bus interfaces 393 of FIG. 3E correspond to the 2×2 ManArray core 100 depicted in FIG. 1A. The I fetch Xpand unit 387, which corresponds to unit 103 of FIG. 1A, fetches abbreviated instructions from reduced B-bit instruction memory 389 which corresponds to memory 105 of FIG. 1A. Unit 387 also translates the instructions as described in the present invention.

The next step as shown by the examples of FIG. 3A determines the final type of core to be developed. In step 305, the core for an application-1 optimized 12-bit subset processor is determined. In step 306, an application-2 optimized 15-bit subset processor is determined. These final process steps 305 and 306 result in the definition of a silicon core comprising an optimized design for the intended application. The choice of 12-bit or 15-bit processor, or other abbreviated-instruction format and configuration, depends upon the application code and product requirements. The optimized design silicon cores still retain their programmable nature and can be designed with additional space reserved in the abbreviated-instruction memory and translation apparatus if desired for additional flexibility in the intended application.

In a similar manner, a subset of the full ManArray architecture can also be employed without using the abbreviated-instruction tool to produce optimized 32-bit processor cores. This path is indicated by step 320. For example, this process may be advantageous in connection with the removal of MPEG video instructions from a communications only application core. The resultant code can be verified in the Manta-1 hardware evaluation vehicle as in step 321, and an optimized silicon core produced for the intended application as indicated in optimized subset 32-bit processor step 322.

Instruction Abbreviation

The approaches described in this invention for abbreviating instructions, hardware to execute the abbreviated instructions, and supporting configurations of the core processor have a number of unique and advantageous differences with respect to the approach used in the previously mentioned U.S. patent application Ser. No. 09/215,081. In the present invention, a program, using the full ManArray native instruction set, is used as input to the instruction-abbreviation tool and a new stand-alone abbreviated representation of the program is uniquely produced dependent upon the common characteristics of the initial program. In this present invention, all instructions including control flow and 32-bit iVLIW instructions, such as Load VLIW (LV) and execute VLIW (XV) instructions, can be abbreviated, allowing the abbreviated program to stand-alone without any use of the original 32-bit instruction types in the program flow. The abbreviated-instruction program, stored in a reduced-size instruction memory, is fetched instruction-by-instruction and each abbreviated instruction is translated into a native form that then executes on the ManArray processor. The abbreviated-instruction translation hardware may use one or more styles of translation formats if it is determined by the instruction-abbreviation tool that a smaller abbreviated-instruction memory can be obtained through the use of multiple styles. Note that the preferred approach is to do the translation of abbreviated instructions in the SP and only dispatch PE instructions in native form to the array of PEs. By using the SP to dispatch PE instructions, the array power can be reduced during SP-only operations, a feature not previously described in the ManArray architecture. Further, even though each program will have a different abbreviated form resulting in a potentially different configuration of the resultant processor core, in each case, all the abbreviated instructions are subsets of the ManArray architecture. These aspects of the present invention are explained further below.

The ManArray architecture uses an indirect VLIW design which translates a 32-bit execute VLIW instruction (XV) into a VLIW, for example, a VLIW consisting of Store (S), Load (L), ALU (A), MAU (M), and DSU (D) instructions as in memory 109 of FIG. 1A in the SP/PE0 101 and in each of the PEs 151, 153, and 155. With judicious choices in the definition of the iVLIW XV instruction, it is possible to create a reduced B-bit XV instruction which indirectly chooses a VLIW from the VLIW memory (VIM) 109 in the SP and in each PE for execution. This is a form of abbreviation; however, due to these judicious choices, there would be compromises made in the reduced instruction format.

It is also possible to create an abbreviated B-bit instruction that can be translated into a native C-bit form. For example, a 32-bit instruction abbreviated into a 13-bit instruction would use a separate memory, or translation memory (TM), to contain the necessary bits of the original 32-bit instruction that are not represented in the 13-bit form. The TM is used in the process to translate the 13-bit abbreviated form back into a form containing all the information of the original native instruction necessary for execution, though not necessarily in the same format as the documented native format. For implementation reasons, the internal processor version of the native format can vary. The important point is that all the information context of the native format is maintained. It is also noted that each Store, Load, ALU, MAU, DSU, and control opcode type may use its own translation-memory (TM). Two related but distinctly different uses of VIMs, individually associated with execution units. are described in further detail in U.S. patent application Ser. Nos. 09/215,081 and 09/205,558, respectively.

In the present invention, a TM, is directly used in the translation process for every instruction. The TM does not contain VLIWs, but the TM does contain partial bit-patterns as defined by a selected style. One of the aspects of the present invention is the mechanism for translating the abbreviated instructions back into a native form necessary for execution. By translating back into a native form, the full capabilities of the ManArray architecture remain intact at the execution units. In other words, the abbreviation process does not restrict the programmer in any way. The only restrictions are determined by the programmer in selecting rules to govern the program creation based on characteristics of the application and desired performance, size, and power of the configurable processor core to be built at the end of the development process. This invention also provides a mechanism so that after the functionality of an application program is stabilized, or at some point in the development process at the discretion of the product developer, the execution units can be made into subsets of the full ManArray architecture definition optimized for the intended application.

FIG. 3B shows further details a presently preferred encoding format 10 for the ManArray single B-bit abbreviated instructions. This format 10 is also shown in FIG. 1B in less detail. The abbreviated-instruction format 10 uses a single bit (B-1), S/P bit 330, in array processors to indicate if the instruction is an SP or a PE instruction, a three bit opcode field 335 (B-2, B-3 and B-4), and bits 340 (B-5 through 0) which are interpreted by styles. For example, in a B=14-bit abbreviated-instruction encoding, bit-13 is the S/P-bit, bits 12–10 represent the opcode field, and bits 9–0 define the specifics for each opcode type. The eight opcode encodings are defined for an implementation, namely Store (S) 341, Load (I,) 342, ALU (A) 343, MAU (M) 344, DSU (D) 345, control flow 346, Set V and LV iVLIW 347, and XV iVLIW 348. Set V, LV, and XV are specific instructions of the ManArray architecture. The concept of styles is discussed next.

A style-field is a specific set of bits, identified by the instruction-abbreviation tool's analysis of a particular program or by human perception, that, for the specific analyzed program, change infrequently with respect to the other bits in the instruction stream. Note that multiple style-fields can be identified depending upon the characteristics of the application code. There may be a different style-field for each opcode in the abbreviated-instruction format, multiple style-fields within an opcode, or common style-fields for multiple opcodes. In the hardware, a style is defined as a logical mechanism, operative for at least one instruction but more typically operative on a group of instructions, that specifies how the translation is to occur. The style is indicated in hardware by a set of bits, such as the four bits (15–12) loaded in 4-bit style register 351 of FIG. 3C. These 4-bits can be loaded in the same programmer-visible control register associated with a Vb TM base address register 353 also shown in FIG. 3C. For the specific example shown in FIG. 3C, a 4-bit style register 351 is defined along with up to a 12-bit Vb TM base address register 353.

It is anticipated that the TMs will usually require only a small address range and the number of styles needed will also usually be small. For example, an implementation may use only two styles and use TMs of only 64 addresses. Depending upon the analysis of the program to be reduced in size, it may turn out that the number of bits in the different style-fields is constant, allowing a single TM to be implemented where the different styles relate to different address ranges in the single TM. The distribution of the style-field bits can be different for each style and is specified by the definition of each style. Alternatively, physically separate TMs, associated with each style in the abbreviated-instruction format, can be provided. A combination of separate TMs and address-range selectable TM sections can be used dependent upon the style-fields chosen, as discussed in further detail in the following sections. Note that for a TM which holds multiple style bit-patterns, the style can be indirectly inferred by the address range within the TM accessed as part of the translation mechanism. Also note that depending upon the characteristics of the program being reduced, there can be a common style associated with a common TM base address register, individual styles with a common TM base address register, a common style with individual TM base address registers, and individual styles with individual TM base address registers among the different opcodes. The choice of which approach to use is dependent upon the characteristics of the program being reduced and product needs.

It is noted that alternatives to the encoding shown in FIG. 3B are possible that are based on the analysis of the program. For example, if a common style-field is used for both ALU and MAU instructions, it may be advantageous to assign only one abbreviated-instruction opcode to represent both groups of ALU and MAU instructions. In this case, it is important to note that it is not necessary to distinguish between the two instructions during the translation process. The determination of the instruction type occurs naturally during the decode phase of the pipeline. Consequently, the abbreviated-instruction opcodes, except for C-bit VLIW instructions, can be chosen independent of the native instruction opcodes based on other distinct groupings of instructions that provide the highest degree of program size reduction.

Type 1 Translation

Figure 4:
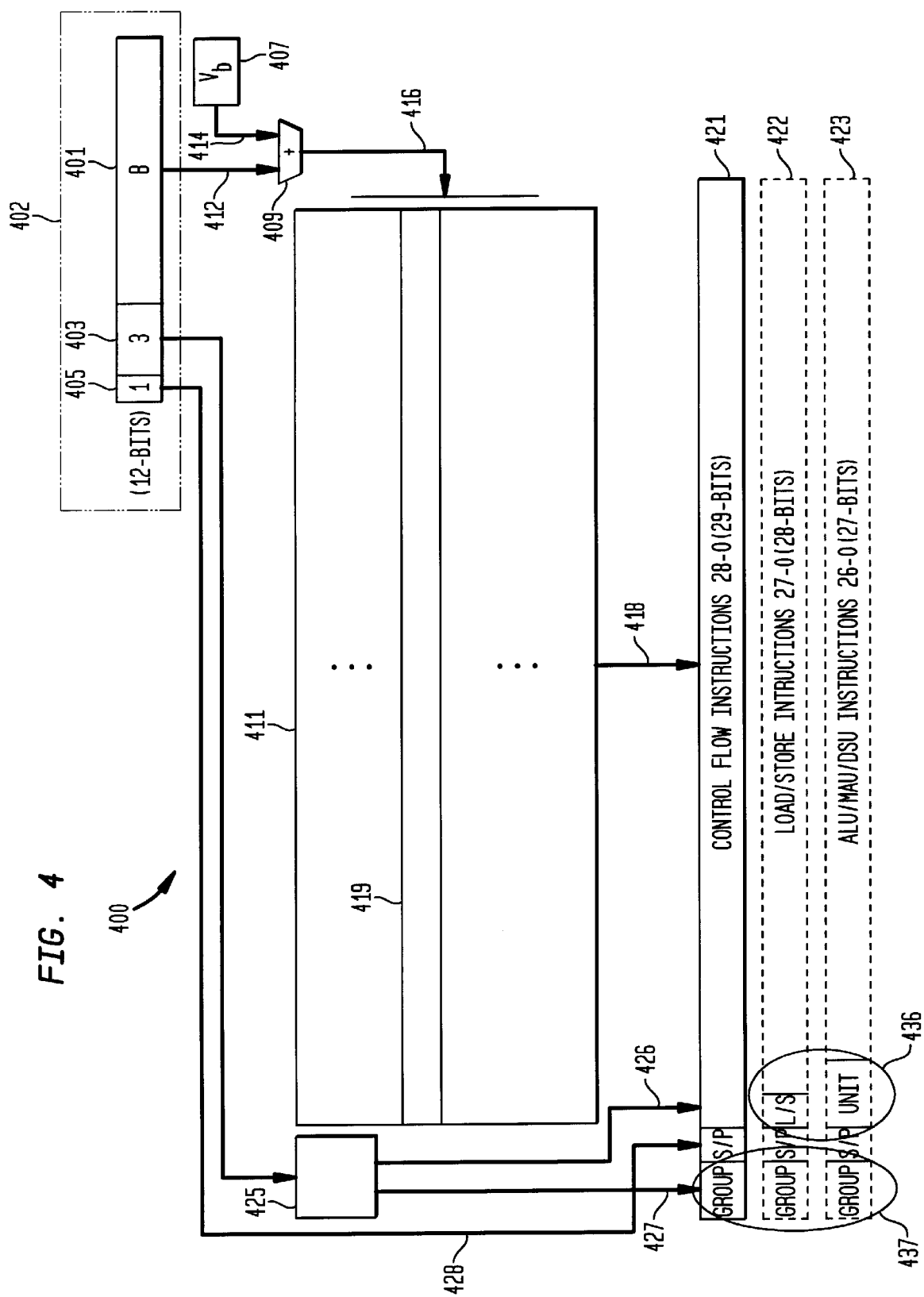
FIG. 4 illustrates a type 1 abbreviated-instruction translation apparatus in accordance with the present invention.

FIG. 4 represents a system 400 for controlling the flow of a translation process wherein a B=12-bit instruction 402 comprised of an S/P-bit 405, a 3-bit opcode 403, and an 8-bit TM address offset 401 is used to select 27, 28, or 29 bits from a location 419 in a TM 411 and load the bits into an instruction register 421 via path 418 in preparation for decoding and execution. After translation, three exemplary native instruction forms are shown in registers 421, 422 and 423 in FIG. 4. Control flow instructions are shown in register 421 using 29 bits from TM 411. Load/store instructions are shown in register 422 using 28 bits from TM 411. ALU/MAU/DSU instructions are shown in register 423 using 27 bits from TM 411. The group bit fields 437 are attained through decoding the 3-bit opcode field 403 in decoding block 425 and providing these bits on input 427. The group field bits in the ManArray architecture define major classes of instruction, namely 00-reserve, 01-flow control, 10-load/store, 11-ALU, MAU and DSU instructions. Similarly, the L/S or unit bit fields 436 are also attained through decoding the 3-bit opcode field 403 in decoding block 425 and providing this bit or bits on input 426. The S/P-bit 405 is available directly via input 428 from instruction 402. Note that the group, S/P, L/S, and unit fields shown in register 421, since they are generated from the S/P-bit 405 and the opcode 403, may not necessarily be loaded into register 421 directly associated with the rest of the instruction bits, as shown in FIG. 4. Instead, the S/P-bit 405 and the opcode 403 bits may be used more directly in the control logic as an alternative implementation option. Note that the 29 bits of 421, the 28 bits of 422, and the 27 bits of 423 may be placed in a manner best suited by a hardware implementation. The TM address 416 is formed by adding a TM base address 414 stored in a base register Vb 407 with the 8-bit offset 412 in adder 409. The use of the Vb base plus offset TM addressing allows a greater translation range if needed. If the application task is small, then an 8-bit TM address may be used directly. This translation approach of system 400 removes any duplication of exact forms of C=32-bit instructions in the application program and requires that for every unique C=32-bit instruction there exists a 29-bit location in the TM 411. This approach provides one level of instruction abbreviation.

Type 2 Translation

Where only certain bits within the C-bit (32-bit) native instruction format tend to change frequently in an application program, it is conceivable to divide the C-bit instruction into two or more portions which are not necessarily contiguous bit field portions, and analyze the pattern of bit changes in these two portions across the application program. Using the information obtained from this analysis, it is then possible to determine a number of strategies to abbreviate the instructions and to handle the instruction translation mechanism. Three examples of this further approach are shown in FIGS. 5A, 6A, and 6C.

Type 2A Translation

Figure 5A:
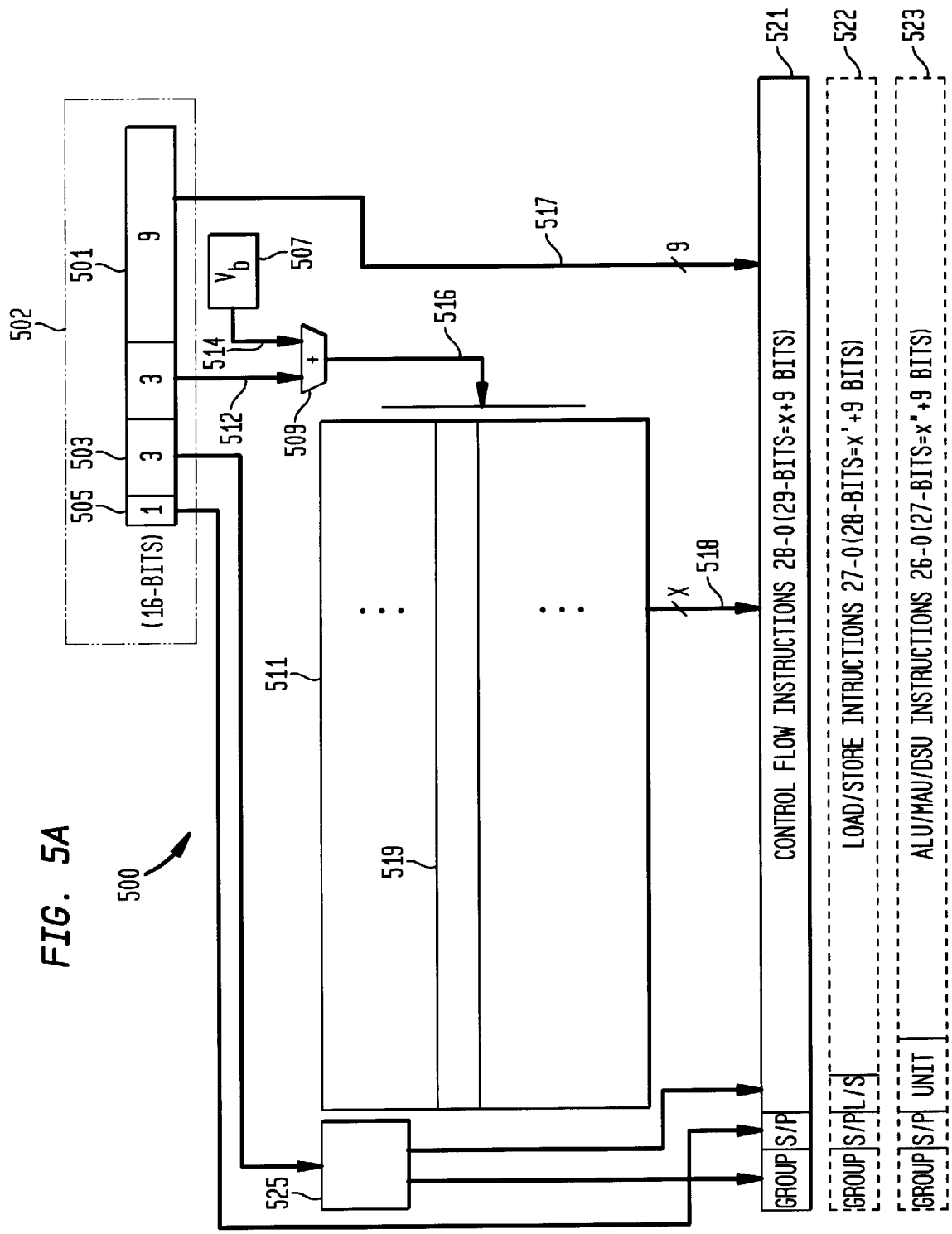
FIG. 5A illustrates a type 2A abbreviated-instruction translation apparatus in accordance with the present invention.
Figure 6A:
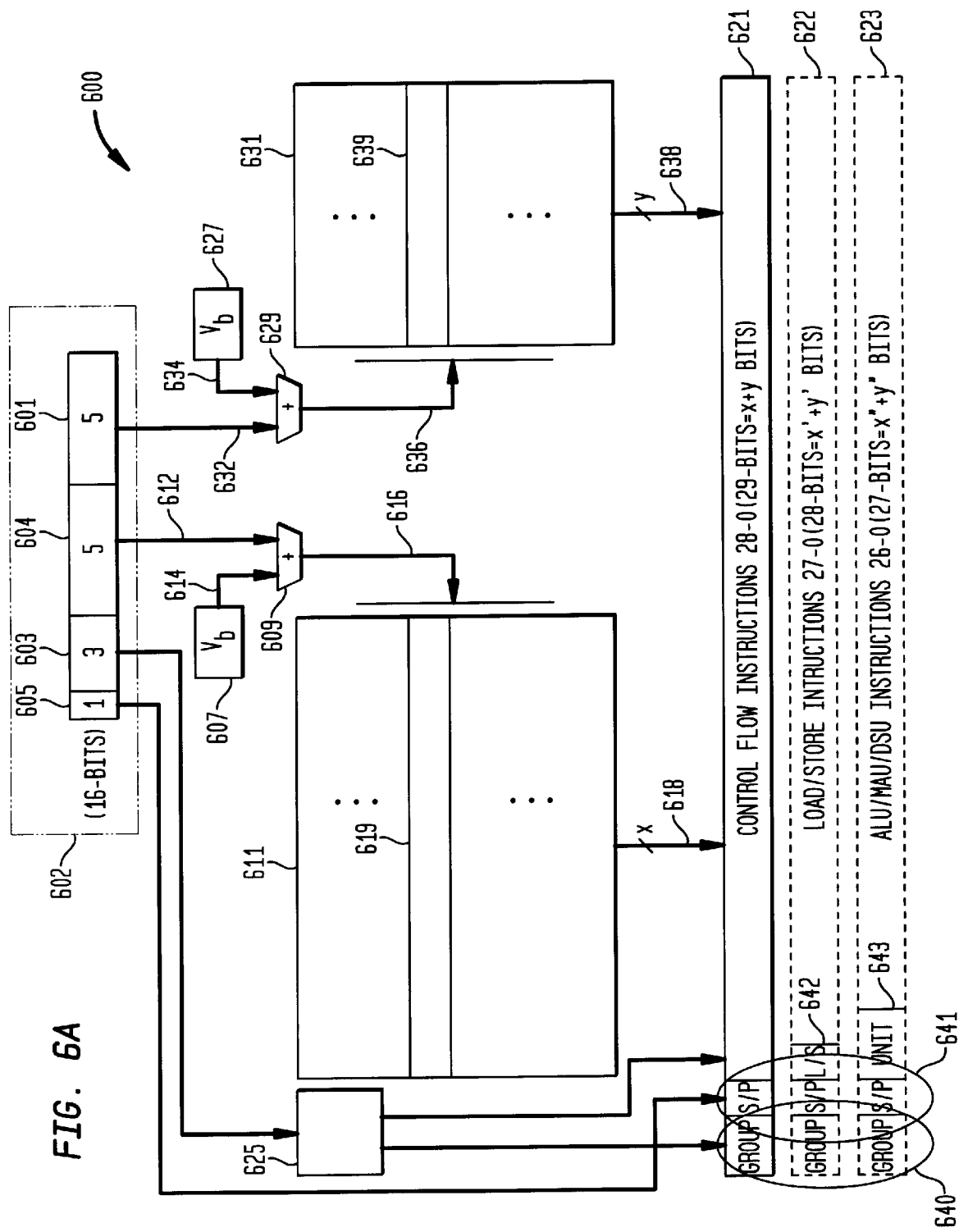
FIG. 6A illustrates a type 2B abbreviated-instruction translation apparatus in accordance with the present invention.
Figure 6C:
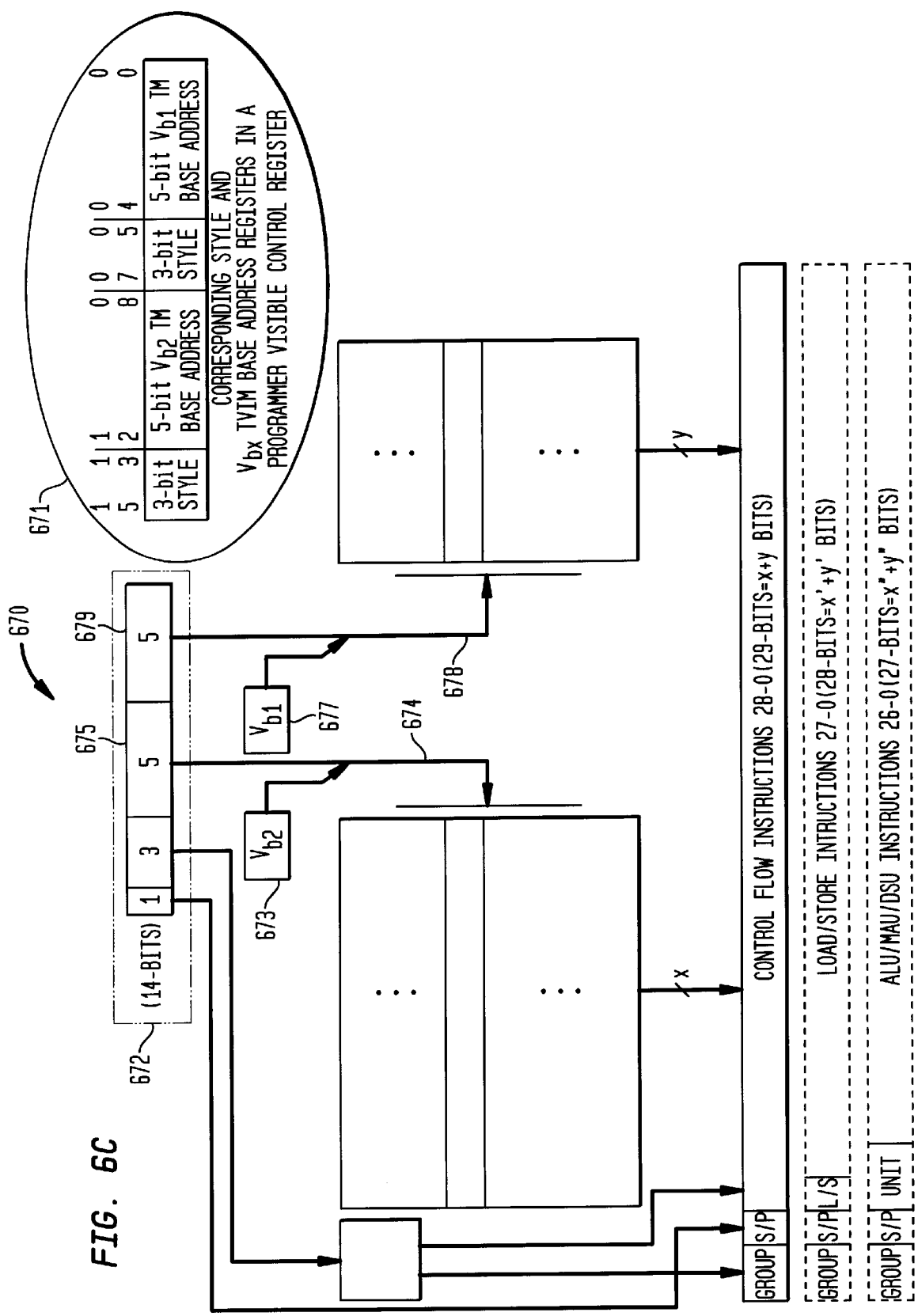
FIG. 6C illustrates a type 2C abbreviated-instruction translation apparatus using an alternative translation memory (TM) addressing mechanism in accordance with the present invention.

FIG. 5A represents a translation mechanism 500 based upon the number of bits which tend to change most frequently within the instructions used in an application program. The abbreviated-instruction format shown in FIG. 5A is a B=16-bit instruction 502 comprised of four parts: an S/P-bit 505, a 3-bit opcode 503, a 3-bit TM offset field 504, and a 9-bit field 501. The 3-bit TM offset field 504 is used to select an X-bit portion 518 of the native instruction from a location 519 in a TM 511 and load it via TM output path 518 into an instruction register 521. The 9-bit field 501 contains bits which are directly loaded via path 517 to create a native instruction form in register 521 in conjunction with the TM portion 518 and group, S/P, L/S, and/or unit bits as required in preparation for decoding and execution. The native instruction forms, for example shown in FIG. 5A, are control flow instructions in register 521, load/store instructions in register 522, or ALU/MAU/DSU instructions in register 523. The TM address 516 is formed by adding a TM base address 514 stored in a Vb base register 507 with the 3-bit offset 512 in adder 509. Note that with only a 3-bit TM offset, the Vb base register may need to be loaded multiple times during program execution. Some overhead instructions to manage the Vb register and style register are required to be added to the abbreviated program. Also note that the 29 bits of instructions stored in register 521, the 28 bits of instructions stored in register 522, and the 27 bits of instructions stored in register 523 may be placed in a manner best suited by a hardware implementation.

Figure 5B:
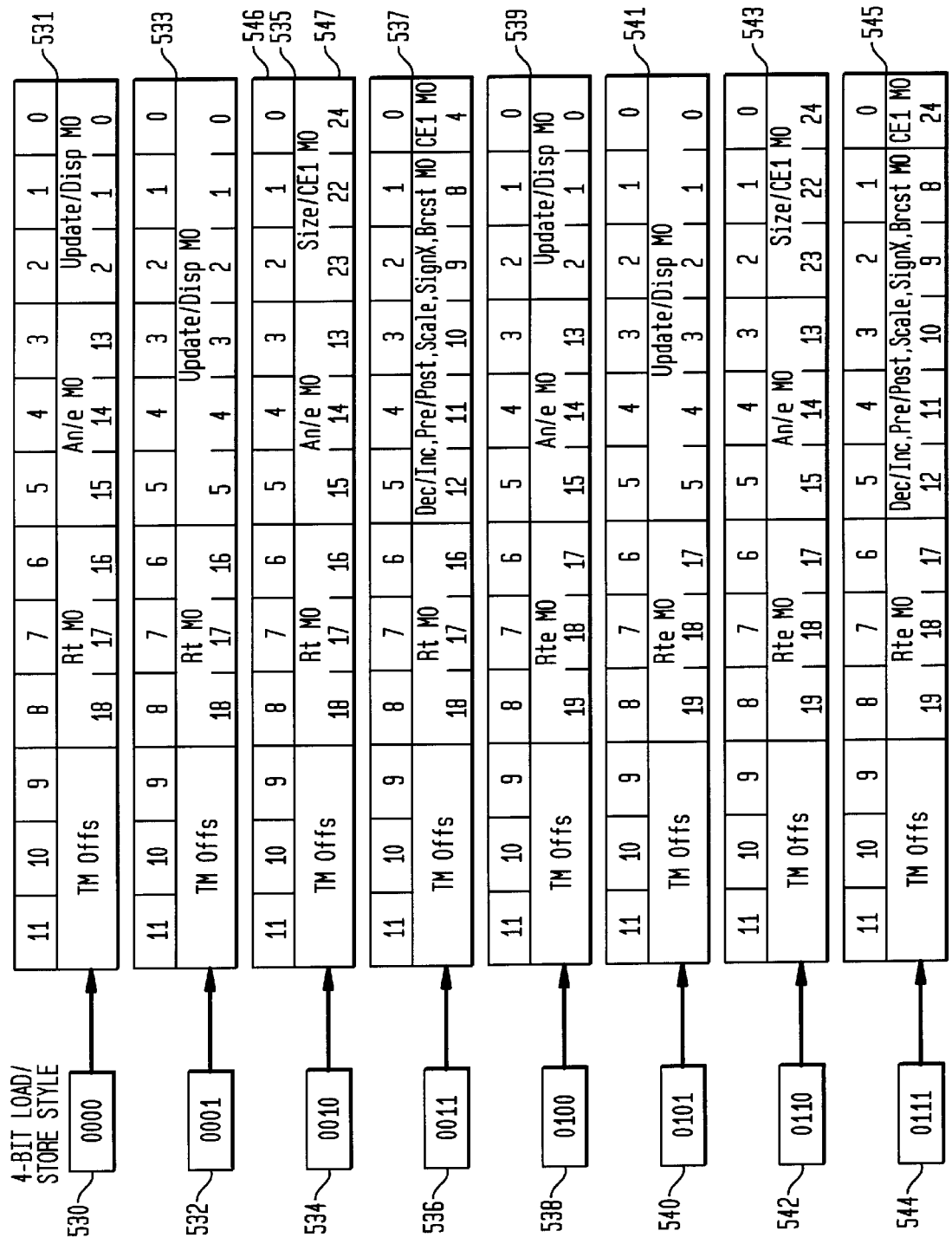
FIG. 5B illustrates exemplary abbreviation styles for store and load unit instructions in accordance with the present invention.

As shown in FIG. 5A, the control flow instructions of register 521 use 29=X+9-bits, while the Load/Store instructions use 28=X'+9-bits, and the ALU/MAU/DSU instructions use 27=X"+9-bits. Since the instruction type is defined by the 3-bit opcode field 503, a different TM can be assigned for each opcode type. Consequently, the style and bit-width X can vary for each defined opcode type, such as opcodes 341–348 shown in FIG. 3B. Examples of possible style-fields for the 16-bit abbreviated-instruction 502 shown in FIG. 5A are shown in FIGS. 5B–5E. In FIGS. 5B–5E, "MO" stands for "map out". In particular, FIG. 5B illustrates eight styles 530–544 for the Load and Store units showing a presently preferred encoding of 4-bit style bits for these instructions. The particular 9-bit fields 531–545 for 9-bit field 501 of FIG. 5A that are to be loaded into the instruction register 521 of FIG. 5A are also shown. The particular bits loaded into register 521 and their bit position within register 521 are itemized within bits 8–0 of the 9-bit fields shown in FIG. 5B. The bits not shown in a particular style are loaded from the TM 511 of FIG. 5A via path 518. As can be seen, the bit patterns are not necessarily consecutive across all 9-bits. The style encoding of FIG. 3C and in styles 530–544 of FIG. 5B indicates how the bits from the TM and the bits from the abbreviated instruction received in register 502 are to be set into the register 521 of FIG. 5A. For example, style 534 of FIG. 5B representing the 12-bits of the abbreviated instruction received in register 502 of FIG. 5A including the 9-bit field as shown in 535 requires that bit 0 546 (FIG. 5B) of register 502 of FIG. 5A be placed into bit 24 547 (FIG. 5B) of register 521 in FIG. 5A. Similarly, bits 2 and 1 535 (FIG. 5B) are placed into bits 23 and 22 521 (FIG. 5A), bits 5–3 535 (FIG. 5B) arc placed into bits 15–13 521 (FIG. 5A), and bits 8–6 535 (FIG. 5B) are placed into bits 18–16 521 (FIG. 5A). The style-field bit pattern 531–545 illustrated in FIG. 5B defines how the bits of instruction 502 of FIG. 5A map to bit positions in the instruction in register 521 in FIG. 5A.

Figure 5C:
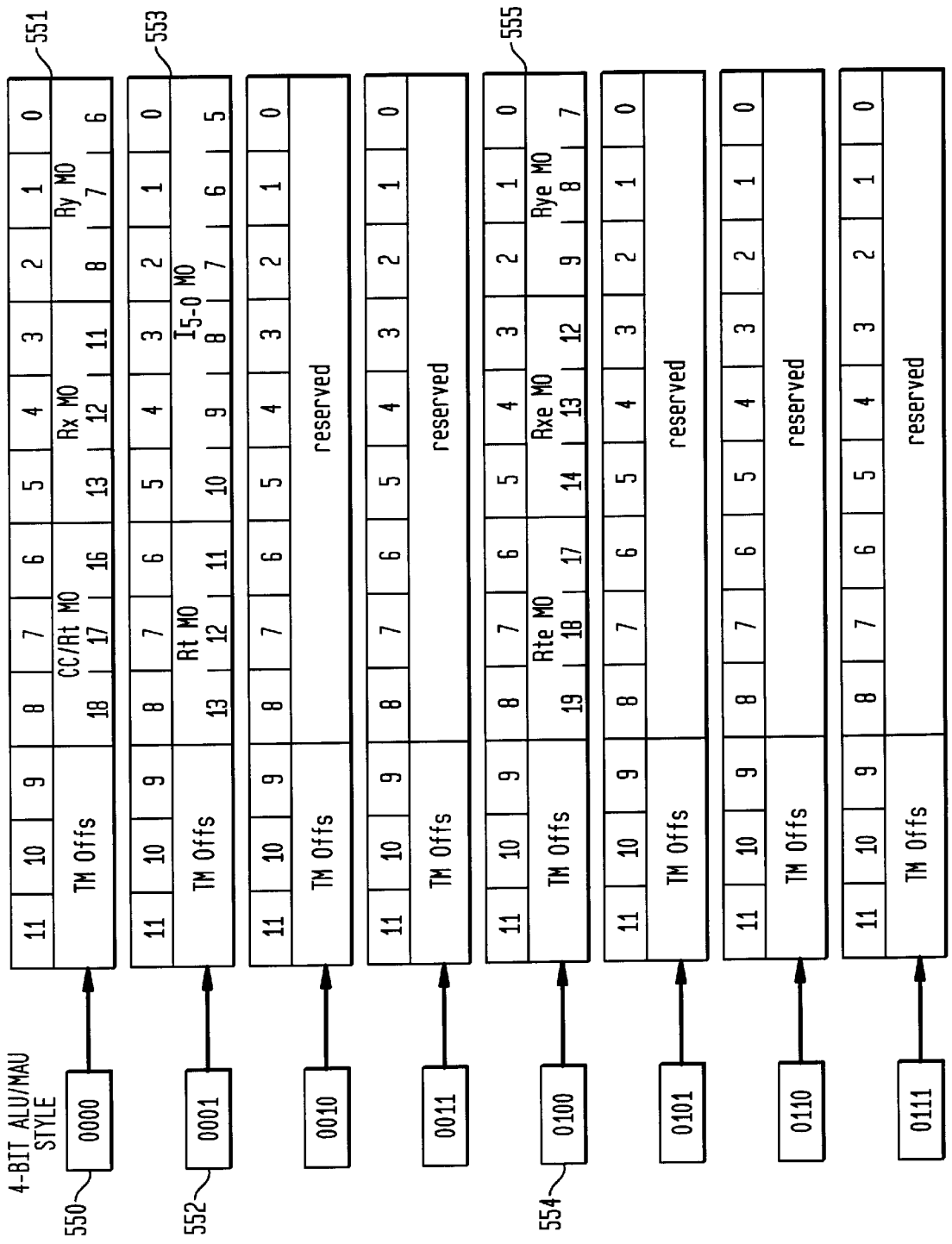
FIG. 5C illustrates exemplary abbreviation styles for MAU and ALU instructions in accordance with the present invention.
Figure 5D:
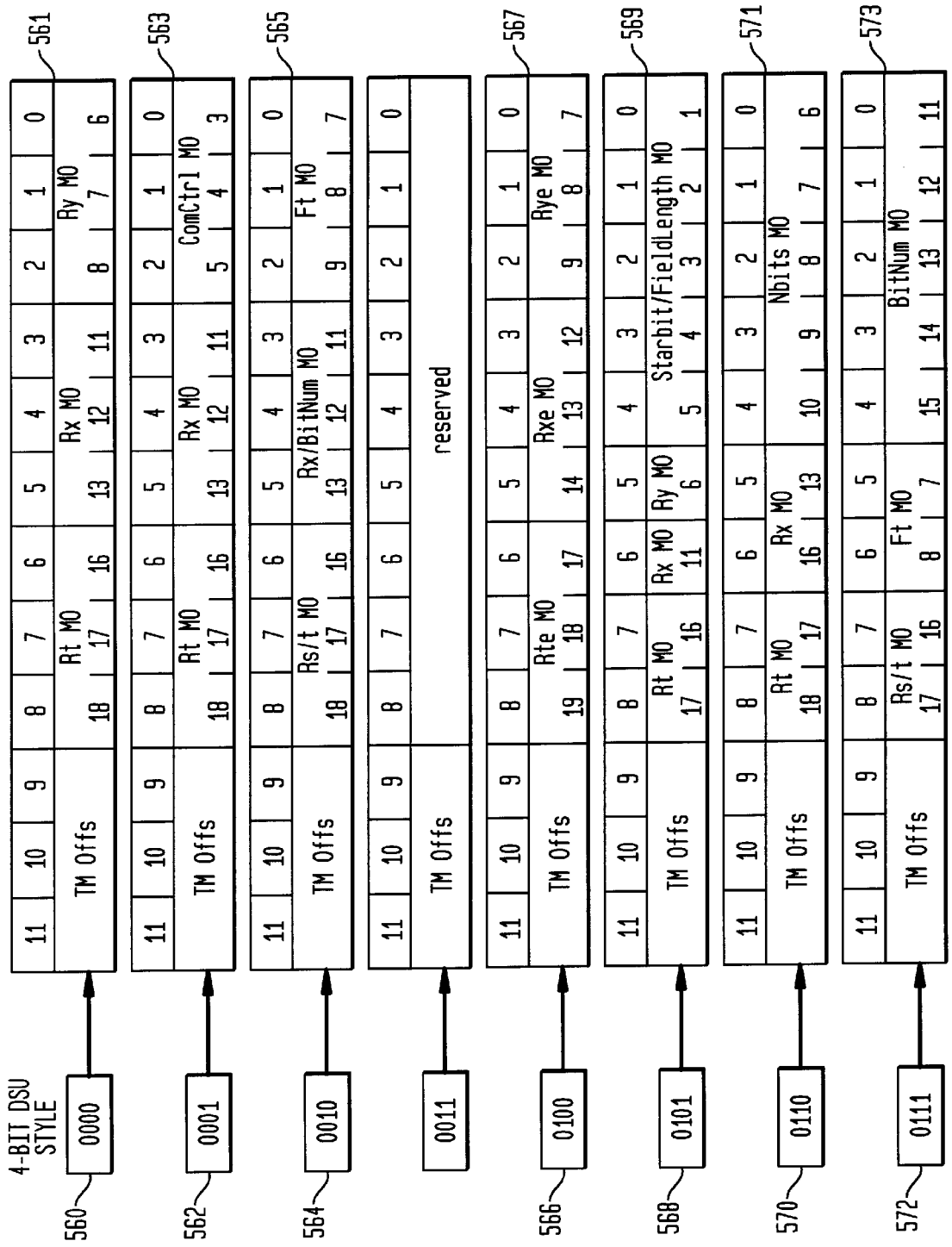
FIG. 5D illustrates exemplary abbreviation styles for DSU instructions in accordance with the present invention.
Figure 5E:
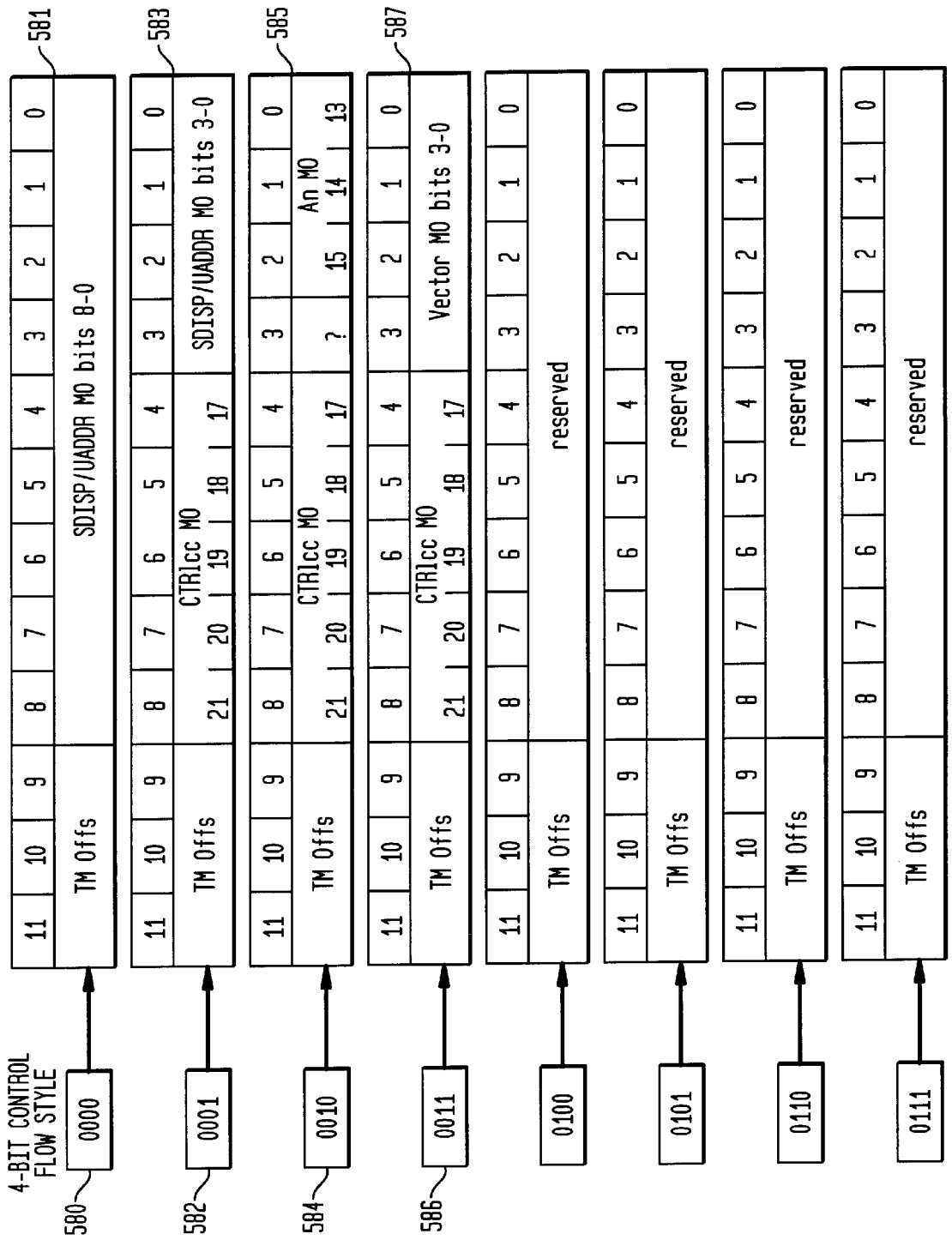
FIG. 5E illustrates exemplary abbreviation styles for control flow instructions in accordance with the present invention.

In a similar fashion, eight styles are shown for the MAU and ALU instructions in FIG. 5C. Only three of these styles 550, 552 and 554 have been numbered, as have their corresponding style-field bit patterns 551, 553 and 555. The remaining unnumbered styles correspond to bit patterns which are presently reserved. Exemplary styles for the DSU instruction are shown in FIG. 5D where seven style encodings 560–572 are shown. The unnumbered style corresponds to a bit pattern which is presently reserved. Corresponding bit patterns 561–573 are also shown. Control flow style encodings 580–586 are shown in FIG. 5E with their corresponding bit patterns 581–587. In FIG. 5E, four styles correspond to reserved bit patterns.

Type 2B Translation

FIG. 6A illustrates a presently preferred translation mechanism 600. This mechanism is based upon the number of bits which tend to change most frequently within the instructions used in an application program. The abbreviated-instruction type shown in mechanism 600 is a B=14-bit instruction 602 comprised of an S/P-bit 605, a 3-bit opcode 603, a first 5-bit TM offset field 604, and a second 5-bit offset field 601. The first 5-bit TM offset field 604 is used to select an X-bit portion of the C=32-bit instruction from a first TM 611 and load it via a first TM output path 618 into an instruction register 621. The second 5-bit offset field 601 is used to select a Y-bit portion of the C=32-bit instruction from a second TM 631 and load it via the second TM's output path 638 to create a native instruction form 621 in conjunction with the first TM portion and group 640, S/P 641, L/S 642, and/or unit 643 bits as required in preparation for decoding and execution. Three exemplary native instruction forms are shown in registers 621, 622 and 623 in FIG. 6A. Control flow instructions are shown in register 621. Load/store instructions are shown in register 622. ALU/MAU/DSU instructions are shown in register 623. These instructions are produced by translating the abbreviated-instruction 602 into a native instruction form prior to decoding and execution. Note that the 29 bits of 621, the 28 bits of 622, and the 27 bits of 623 may be placed in a manner best suited by a hardware implementation. The two TM addresses 616 and 636 are formed by adding individual TM base addresses 614 and 634, stored in base register Vb2 607 and base register Vb1 627, to the 5-bit offset 612 and 632 in adders 609 and 629, respectively. It is noted that the format of the B-bit instruction can be different depending upon the B-bit opcode field. For example, FIG. 6B illustrates a 14-bit iVLIW encoding format 650 for the XV iVLIW opcode encoding "111"652 also shown in encoding 348 of FIG. 3B. A first TM offset field 654 is a 6-bit field and a second TM offset field 656 is a 4-bit field. It is noted that multiple styles can be used in the translation mechanism 600 of FIG. 6A. The sample analysis in a later section reports program size reduction for an exemplary 14-bit abbreviated-instruction format with four styles being utilized.

Type 2C Translation

Another approach to TM accessing and abbreviated-instruction translation is illustrated in FIG. 6C. Mechanism 670 of FIG. 6C is similar to mechanism 600 of FIG. 6A with several notable exceptions. The format of a control register 671, shown in detail in an insert to FIG. 6C, as compared with format 350 of FIG. 3C is different. In the system of FIG. 6C, the style field and Vb TM base address register size have been reduced to an 8-bit format size as compared to the 16-bit format used in FIG. 3C. With the format of register 671 in FIG. 6C, eight styles can be obtained per TM. The TM addressing of FIG. 6C is a second difference to note from the previous discussions of FIG. 6A. In FIG. 6C, TM addresses 674 and 678 are formed by concatenating the Vb base address registers $V_{b2}$ 673 and $V_{b1}$ 677 with offset fields 675 and 679, respectively. Specifically, the Vb value forms the high address field and the offset field from 672 forms the low address field of the TM address. With a 5-bit Vb and a 5-bit offset, up to 1024 TM addresses can be generated. No TM address adder is required. The rest of the abbreviated-instruction translation apparatus 670 operates as previously described.

Type 2 Translation Extension

It will be recognized that there exist instruction set architectures employing more than 32-bits, such as 40-bits, 48-bits, and 64-bits, among others. The instruction abbreviation process and translation approaches of the present invention would work equally well for these architectures. Further, the concept of splitting the native instruction format into two sections can be generalized to splitting the instruction format into three or more sections. In these cases, the style would cover the three or more sections with separate bit-patterns that would be analyzed in a program's instructions. For each section, there would be a translation memory TM and the abbreviated-instruction translated into the larger native format. For example, a 48-bit instruction could be split into three sections, with each section represented in a TM. The abbreviated-instruction format for this 48-bit case might contain three 5-bit fields, a 3-bit opcode, and a single S/P-bit, totaling 19-bits instead of the 48-bit instruction. It is noted that the 32-bit instruction format may also be split into more than two segments for abbreviation purposes, but present analysis indicates the split into two segments is a better match to presently anticipated needs.

As technology processes continue to improve providing greater density of logic and memory implementations, it becomes desirable to expand the scope of an architecture to take advantage of the greater on-chip density. Instruction abbreviation allows the expansion of the instruction set format while still minimizing the instruction memory size external to the core processor. For example, the ManArray architecture register file operand specification can be expanded from the present 5-bits per operand to 7-bits per operand. Since the ManArray architecture is a three operand specification architecture, this expansion adds 6 bits to the instruction format size. Assuming 2 additional bits are added to expand the opcode field or other field specifiers, the 32-bit ManArray architecture could be expanded to 40-bits.

With instruction abbreviation, the 40-bit instructions could be abbreviated to a B-bit format, where B might be 15, 16, 17, or a different number of bits less than 40 depending upon the application. Since instruction abbreviation decouples the instruction format used by the core processor from the instruction format size stored in instruction memory, the core processor has more freedom to grow in capability and performance, while still minimizing external memory size and access time requirements.

ManArray SP/PE0 Translation

The adaptation of the presently preferred dual TM using mechanism 670 of FIG. 6C is described next. This discussion begins with an exemplary 1×1 SP/PE0 ManArray architecture configuration 700 shown in FIG. 7 and then proceeds to discuss how to use the techniques of the present invention as PEs are added to the SP/PE0 creating a 1×2 array 800 as shown in FIG. 8. Note that in FIG. 6C, the two offset fields, 675 and 679, in instruction 672 are shown as being of equal size. This is not necessary, and depending upon the application code, it may be that different sizes are appropriate for each field.

Figure 7:
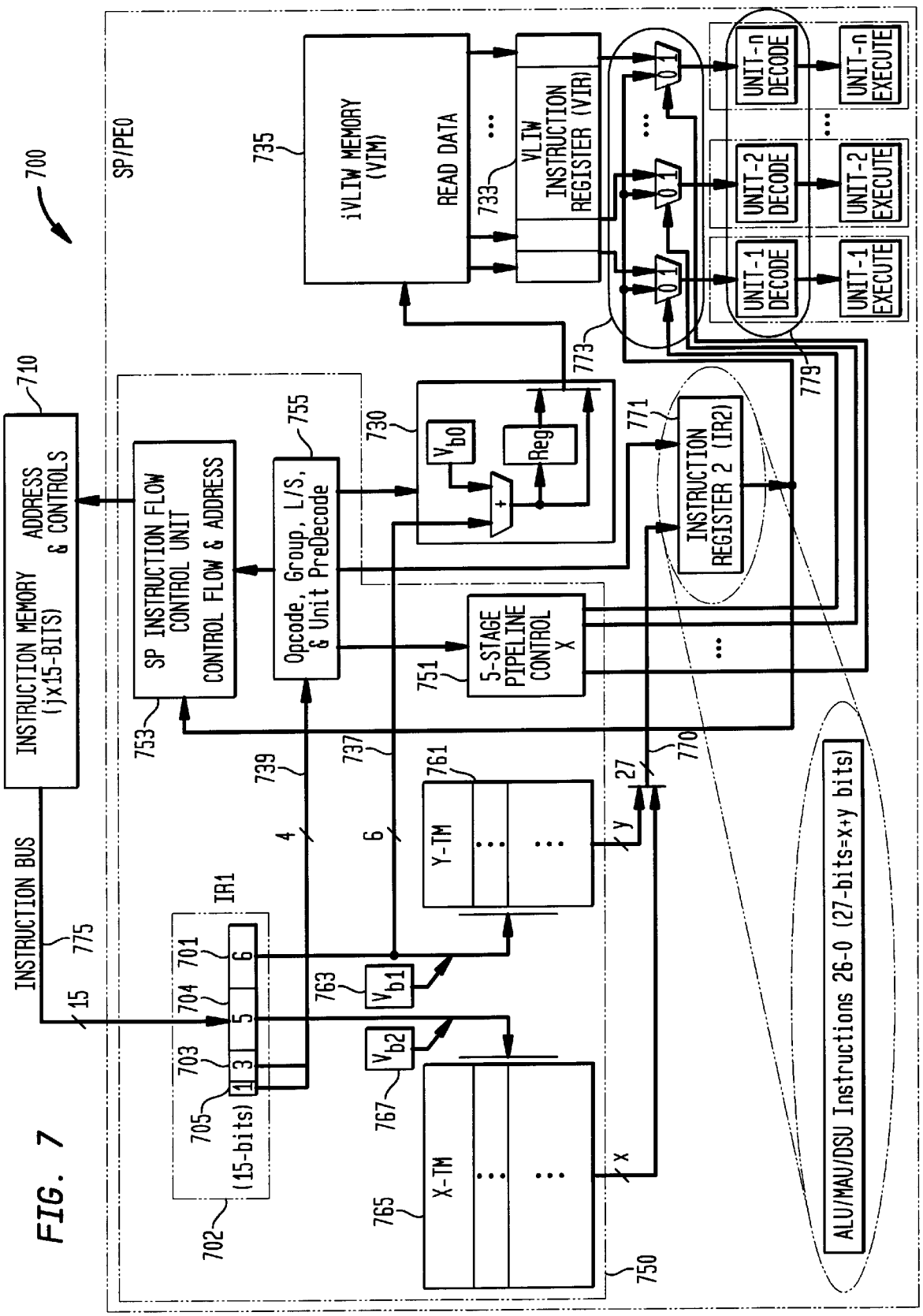
FIG. 7 illustrates the type 2C abbreviated-instruction translation apparatus used in a SP/PE0 core processor in accordance with the present invention.
Figure 8:
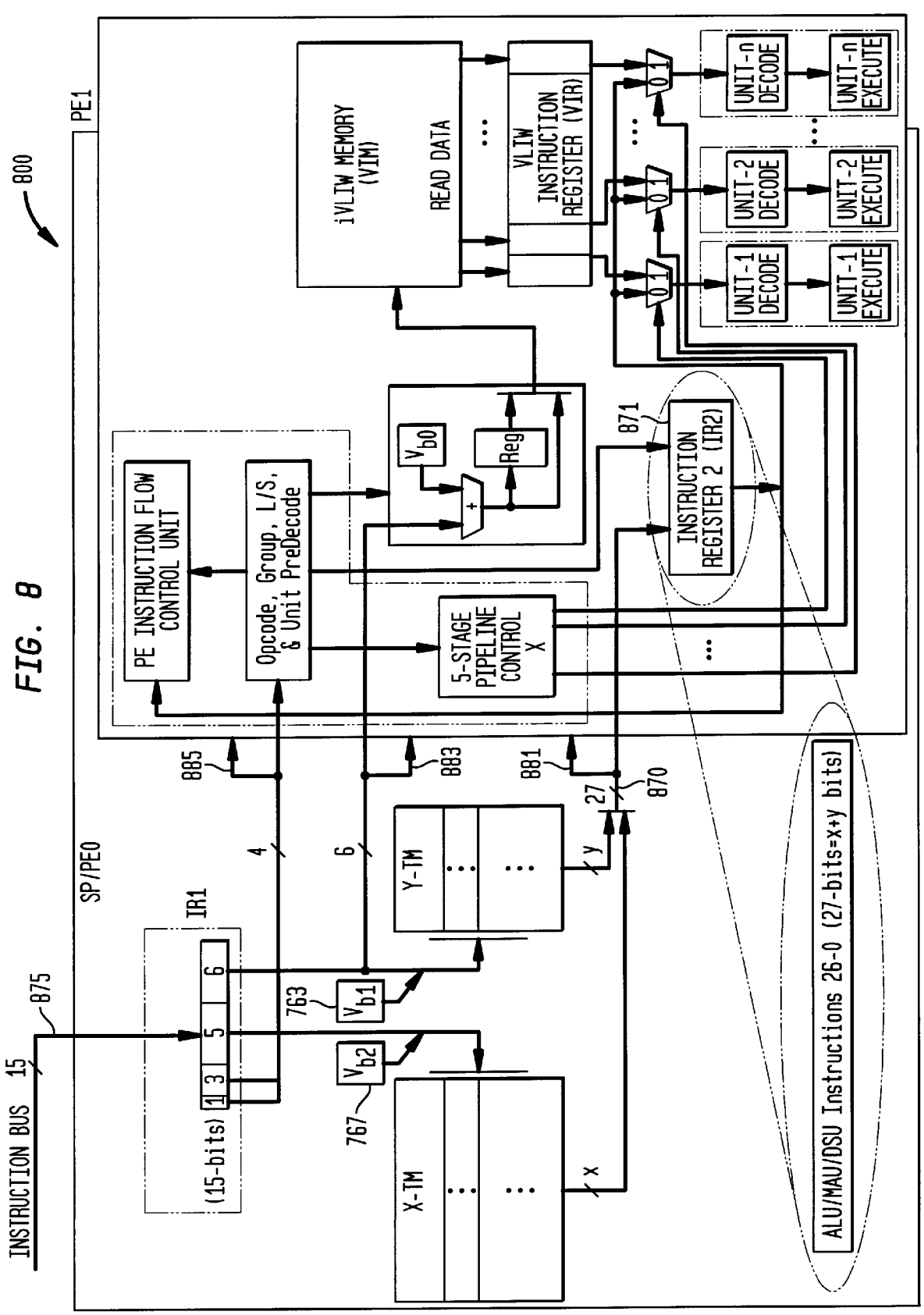
FIG. 8 illustrates the type 2C abbreviated-instruction translation apparatus in use in a 1×2 ManArray processor in accordance with the present invention.

An example of unequal fields is shown in FIG. 7 where an abbreviated-instruction 702 is a B=15-bits instruction comprising an S/P-bit 705, a 3-bit opcode field 703, and two TM offset fields 704 and 701 of different sizes. FIG. 7 illustrates a 1×1 processor configuration, also referred to as a combined SP/PE0. In the system configuration 700, the TM apparatus is incorporated in an I-Fetch-Xpand unit 750 which also includes a program counter (PC), branch, EPLoop, interrupt controls, and memory controls, though these are not shown for reasons of clarity. The I-Fetch-Xpand unit 750 is also used as a building block in larger arrays, such as for example, the 2×2 ManArray processor where an I-Fetch-Xpand unit 103 is shown in FIG. 1A. The I-Fetch-Xpand unit 750 includes a pipeline control unit 751 which operates as a 5-stage pipeline, where the pipeline stages are Fetch, Xpand and Dispatch, Decode, Execute, and Condition Return. A typical pipeline example is described in further detail below in conjunction with the discussion of FIG. 10.

For illustrative purposes, FIG. 7 only shows a single pair of translation TMs, Y-TM 761 and X-TM 765 for ALU/MAU type instructions for reasons of clarity. It will be recognized that a complete implementation would typically include multiple translation TMs, each associated with a corresponding compressed B-bit opcode. In the present example, with a 3-bit opcode 703, there could be up to eight sets of TMs, assuming one TM associated with each opcode. With common styles, the number of TMs could be less. For example, if the MAU, ALU, and DSU instructions all used the same style shown as style-4 in the sample analysis below, then a common translation TM could be used with an address range set aside for each instruction type as defined by the opcode. It is also feasible for the load and store instructions to be translated using the same style, see style 3 in the sample analysis below. For these instructions, it is possible to combine style-fields due to the similarity of the instruction format. Specifically, in the case of the MAU and ALU there are common instructions with the same format except for the bit field that specifies in which unit an instruction is to execute. With these design choices, the number of TMs could be four. The abbreviated-instruction opcode decode logic would allow only the proper set of TMs to be accessed and the final output from the four pairs of TMs selected through a multiplexer (not shown) to output bus 770.

Also, not shown in FIG. 7 is a data path to load the TMs under DMA control or by use of the processor's load instructions. Note that in a high volume product, the TMs could be implemented with ROMs, with a small amount of SRAM provided if desired by the product developer. With ROMs implementing the TMs, the DMA to the TMs or use of processor load operations would not be required.

In each cycle, the S/P-bit 705 and opcode bits 703 are sent to the Opcode, Group, L/S, and Unit PreDecode logic 755 over signal lines 739. In addition, the abbreviated-instruction Y-TM offset field 701 is sent to the iVLIW address generation function unit 730 over lines 737. For execute VLIW (XV) instructions in abbreviated form, the dual TM translation occurs in parallel with the XV VLIW 735 access. For XV iVLIW abbreviated instructions of the form shown in FIG. 6B, and with VIMs of 64 or less addresses, the 6-bit Y-TM address field 701 can be loaded directly into register IR2 771, if required by an implementation, without the need of a Y-TM access for the iVLIW instructions. This direct loading approach results in an even further reduction of on-chip resources. At the end of an Xpand and Dispatch cycle, the full 5 instruction VLIW will be loaded into the VLIW instruction register 733 and the translated XV instruction loaded into register IR2 771, providing the additional bits needed to further control iVLIW execution. For the illustrated MAU/ALU/DSU TMs 761 and 765, a 27-bit instruction 770 is translated at the end of the Xpand and Dispatch phase and loaded into the register IR2 771. If the translated instruction in the IR2 register 771 is an ALU instruction, the IR2 output is selected for the ALU execution unit through an appropriate one of the multiplexers 773 and decoded in the ALU in the next cycle. The ALU instruction is then executed in the fourth cycle with a condition return phase completing the 5-stage pipeline.

ManArray 1×2 Translation

FIG. 8 illustrates how the TM fits into a 1×2 array configuration where an additional PE, PE1 890, is added to the SP/PE0 1×1 array 700 of FIG. 7 to for a 1×2 array. For this array, an instruction bus 870 is connected to PE1's IR2 register 871. Interface signals 881, 883, and 885 go to PE0 as shown in FIG. 7. Assuming the instruction is a PE instruction, the pipeline proceeds as already described for the operation of the SP/PE in FIG. 7, except that it instigates operations in both PE0 and PE1. Multiple PEs can be added by distributing the appropriate busses to the additional PEs, with all the PEs operating in SIMD fashion as the exemplary system of FIG. 8 illustrates. Since the translation process occurs in the SP once, as an abbreviated-instruction is received in the SP, only PE instructions in a native-format, or in a format containing the native instruction information content, are dispatched to the attached PEs, PE1, PE2, . . . , PEn. There are two important points concerning this architecture. One is that since the translation process occurs only in the SP, the main instruction memory is accessed only by the SP and instructions are not distributed from the main instruction memory directly to the PEs. This constraint ensures that the instruction memory output bus 875 is a direct path to the SP and consequently has minimum loading. In addition, since the translation process occurs only in the SP, dispatching PE instructions only when required reduces the system power dependent upon array utilization.

Dual Abbreviated-Instruction Fetching

Figure 9:
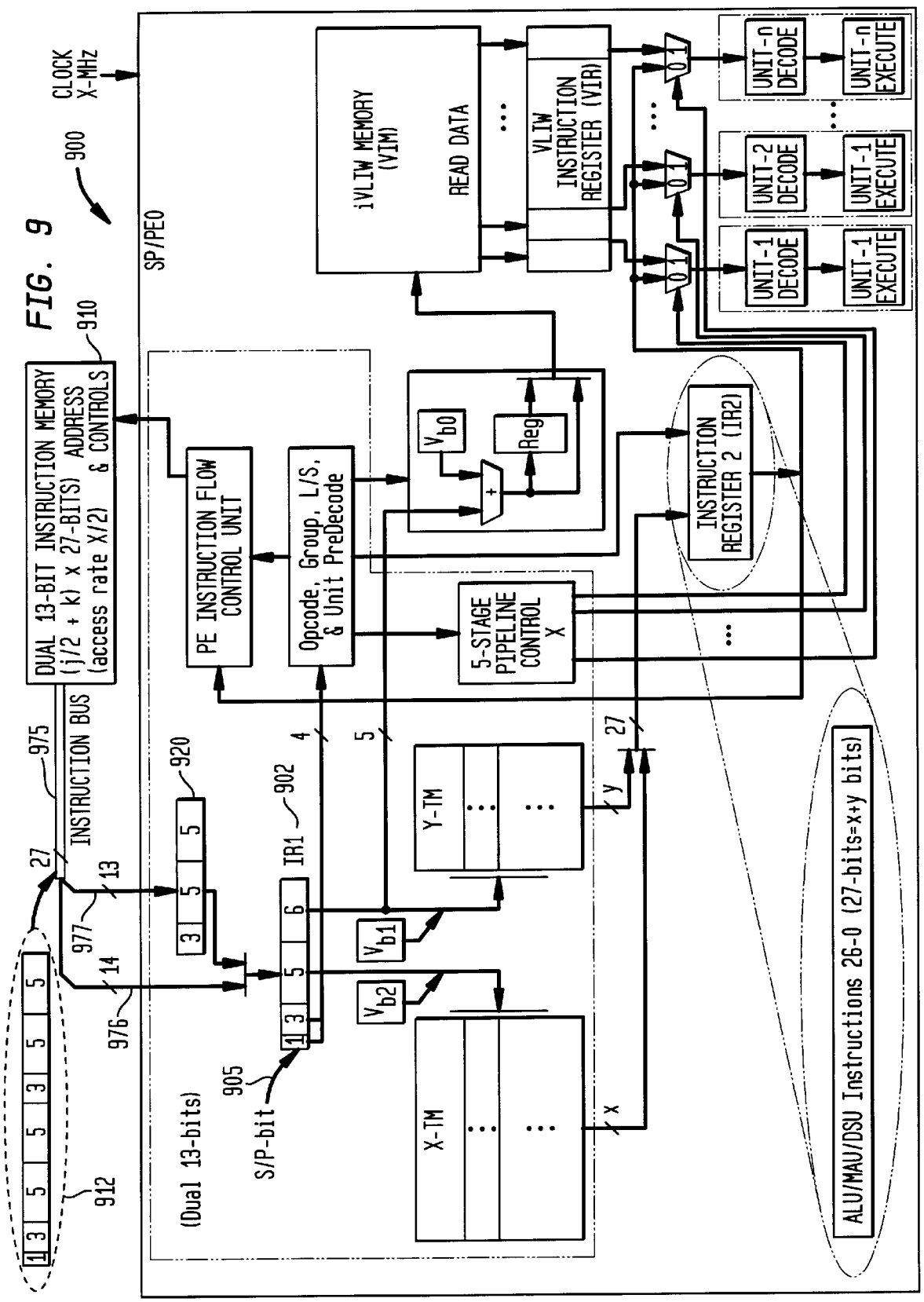
FIG. 9 illustrates a dual-fetch type 2C abbreviated-instruction translation apparatus in use in an SP/PE0 core processor in accordance with the present invention.

The dual abbreviated-instruction format 12A of FIG. 1B is employed in system 900 of FIG. 9. This architecture has the potential of further reducing power consumption of the core processor. In FIG. 9, an abbreviated-instruction memory 910 is implemented as a (j/2)×27-bit SRAM that corresponds to a ManArray native application program of size j×32-bits. It is noted that a small number of TM Vb base address register management instructions would need to be added to the abbreviated program. This need is accounted for in the initial abbreviated-instruction tool analysis step. An example of the two-instruction format as fetched from an instruction memory 910 is shown in instruction insert 912. This has implications for branch operations, so has to be accounted for in the application program development. In this approach, the abbreviated-instruction memory SRAM 910 is less than half the size of the original native instruction memory required for a particular application program. In addition, since two compressed instructions are fetched at a time from the abbreviated-instruction memory, the access frequency is one-half that of the original native memory size for the intended program. This significantly reduces instruction memory power use.

In some applications, it is noted that the abbreviated-instruction program and/or individual tasks of a product program may be stored in a system's storage device whose data types may be based on 32-bits, due to other system needs. In this case, it is noted that two abbreviated instructions can be fit into a 32-bit format with bits to spare. For example, using the format 912 of FIG. 9, five additional bits would be available for other purposes, which may prove advantageous, for example, in a coprocessor environment.

In FIG. 9, the 27-bit instruction bus 975 is split into two unequal segments: a 14-bit segment 976 and a 13-bit segment 977. The individual segments are loaded into register IR1 902 and a pre-IR1 register 920, respectively. The abbreviated-instruction enters the Xpand and Dispatch stage from register IR1 902. At the end of the Xpand and Dispatch stage, the abbreviated-instruction in the pre-IR1 register 920 is loaded into the register IR1 902. The single S/P-bit 905 in this example is not changed when the new abbreviated-instruction is loaded from the pre-IR1 register 920 into the register IR1 902. This use of the S/P-bit has implications to the application code development and would need to be accounted for by the programmer or by analysis and compression tools. A translated PE instruction is dispatched to the PE as previously described. A translated SP instruction remains in the SP for execution and no dispatch action to the PEs occurs. The PEs are aware that an SP instruction is in the pipeline since the S/P-bit is sent to the PEs in all cases.

Pipeline Description

FIG. 10 illustrates a sequence of operations or process 1000 performed in a five-stage pipeline for five clock cycles for a 1×1 array, such as array 700 of FIG. 7. The following sequence of abbreviated-instructions: ADD.S, XV.S, COPY.S, ADD.S, and an instruction Instr(i+4) are illustrated in FIG. 10. For this example, only SP instruction operations are shown and the hardware 700 shown in FIG. 7 is used as a reference for the operations described. Each horizontal row 1010–1050 in the table 1000 of FIG. 10 represents the operations occurring in the abbreviated-instruction processor during some clock cycle of the processor. The columns cycle 1015, fetch 1025, Xpand and Dispatch 1035, decode 1045, execute 1055 and conditional return 1065, correspond to the clock-stage actions which occur in the different clock periods. The row 1010 identified as clock cycle "i" indicates an abbreviated B-bit ADD.S instruction is fetched over the instruction bus 775 of FIG. 7 from the reduced size instruction memory 710 and loaded into the instruction register IR1 702.

In the next cycle "i+1" shown in row 1020, the SP fetches the abbreviated B-bit XV.S instruction and loads it into the IR1 702. While the fetch operation is occurring, the ADD.S is in the Xpand and Dispatch pipeline stage in which a number of operations occur. The S/P-bit 705 indicates this is an SP-only operation. The local dual TM fetches occur and a native form of the ADD.S instruction is loaded into the IR2 771 at the end of the cycle. The S/P-bit and 3-bit abbreviated opcode are sent to the Opcode, Group, L/S, and Unit PreDecode logic 755 and are decoded in the SP with control latches set at the end of this stage as required to control the next stages of the pipeline.

In cycle "i+2" shown in row 1030, the SP fetches the abbreviated B-bit COPY.S instruction and loads it into the register IR1 702 at the end of the fetch cycle. While the fetch operation is occurring, the XV.S instruction is in the Xpand and Dispatch pipeline stage in which a number of operations occur. The S/P-bit and opcode indicate an SP XV operation. The local TM fetches occur and a native form of the XV.S instruction is loaded into register IR2 at the end of this cycle. The S/P-bit and 3-bit opcode are decoded in the SP and appropriate latches are set at the end of this stage. In parallel, the VIM address is calculated by address generation function unit 730 of FIG. 7 and the iVLIW is fetched from the VIM 735. Also, in cycle "i+2", the ALU decodes the ADD.S instruction.

In cycle "i+3" shown in row 1040, the SP fetches the next abbreviated B-bit instruction, which in this example is an ADD.S instruction, and loads it into the register IR1 at the end of the fetch cycle. In the Xpand and Dispatch stage, the COPY.S abbreviated instruction is being translated into a native form suitable for continued processing. In the decode pipeline stage, the VLIW fetched from the VIM representing up to 5 native ManArray instructions is in unit 1-n decoder 779 of FIG. 7. The ADD.S has entered the execute pipeline stage and the results of the ADD.S will be available by the end of this stage.

In cycle "i+4" shown in row 1050, the SP fetches the next abbreviated B-bit instruction, Instr(i+4). The fetched ADD.S abbreviated instruction enters the Xpand and Dispatch stage where it is translated into a native form suitable for decoding and execution. The COPY.S instruction is decoded in the DSU in the decode pipeline stage and the fetched VLIW of up to 5 native instructions enters the execute stage of the pipeline with the results from the up to 5 executions available at the end of this stage. The ADD.S first fetched in cycle "i" enters the condition return stage where any side effects of its execution are stored in programmer visible flag registers, Arithmetic Scalar Flags (ASFs) and the Arithmetic Condition Flags (ACFs).

Other Processor Architectures

As an example of the generality of the instruction-abbreviation process, consistent with the teachings of the present invention, other processor architectures containing one or more execution units can have their opcode space partitioned into one or more separate groups and the instruction format partitioned into one or more bit-pattern style-fields. Based upon a program coded with this other processor architecture, B-bit abbreviated instructions can be formed that can then be stored in a reduced size memory. These abbreviated instructions can then be fetched and translated into a native form internal to the other processor suitable for execution on the other processor.

Since there is a standard B-bit format for this other processor's abbreviated instructions, and a one-to-one mapping between the B-bit instruction and a processor's native instruction, there is no problem storing the abbreviated instruction in a cache, branching to an abbreviated instruction, or taking interrupts as would normally occur in a native processor program.

Sample Analysis

The sample analysis described below is based on a ManArray MPEG decoder application program containing 5050 total native 32-bit instructions. The analysis tool reads instructions as data from an input file <mpeg.dump> where the MPEG decoder program is located. The analysis tool also reads style-fields from input file <style7.dat> where different style-fields can be placed for analysis. For this example, the following styles were used in the analysis program. The dual-TM translation apparatus of FIG. 6A or 6C was used as the underlying hardware for this analysis. The abbreviated instruction opcode type is shown below in the column on the left and the specific style-fields with the bit definition for the Y-TM are shown below in the column on the right. Each opcode type uses only a single style but four unique styles are used. The ability to optimize the styles by opcode type represents an important advantage to further reduce the program memory size.

| VLIW  | 0 1 2 3 4 5                  | Style-1 |
|-------|------------------------------|---------|
| FLOW  | 0 1 2 3 4 5 6 7              | Style-2 |
| LOAD  | 0 1 2 3 4 5 16 17 18 19      | Style-3 |
| STORE | 0 1 2 3 4 5 16 17 18 19      | Style-3 |
| ALU   | 6 7 8 11 12 13 16 17 18 19   | Style-4 |
| MAU   | 6 7 8 11 12 13 16 17 18 19   | Style-4 |
| DSU   | 6 7 8 11 12 13 16 17 18 19   | Style-4 |

An example from the sample analysis program for MAU instructions using style-4 is as follows:

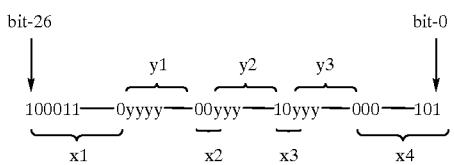

The instruction format given by 100011-0yyyy-00yyy-10yyy-000-101 indicates the Y-TM style-field bit pattern covering y1 (bits 19–16), y2 (bits 13–11), and y3 (bits 8–6). The x-field covers bits x1 (bits 26–20), x2 (bits 15, 14), x3 (bits 10, 9), and x4 (bits 5–0). It is group bits (bits 31 and 30), the S/P bit (29), and the unit field bits (bits 28 and 27) have been excluded from the analysis since the group, S/P, and unit information is covered in the abbreviated instruction format's S/P-bit and opcode bits. In the reported analysis, 12 MAU instructions were found where the X-field was x1=100110, x2=00, x3=10, and x4=000101 which did not change for the 12 instructions and only bits within the y fields changed as follows:

12: 100011-0yyyy-00yyy-10yyy-000-101
3: 100011-00000-00000-10100-000-101 mpyl.pm.4sh r0, r0, r20
3: 100011-00010-00010-10100-000-101 mpyl.pm.4sh r2, r2, r20
3: 100011-00100-00100-10100-000-101 mpyl.pm.4sh r4, r4, r20
3: 100011-00110-00110-10100-000-101 mpyl.pm.4sh r6, r6, r20

Within the grouping of 12 MAU instructions, there were 4 distinct groupings of 3 instructions that each have common Y-bit patterns. In these four cases, the only change is in the register specification field as can be seen in the instructions mnemonics listed to the right of the instruction binary format shown above as r#. In this example of 12 MAU instructions, there would only need to be one location in the X-TM to cover this specific X pattern of bits. For this same 12 MAU instruction example, only four entries are required in the Y-TM to cover the four specific variations noted above. Consequently, the 12 MAU instructions in the MPEG program could be translated or constructed from a single X-TM location in combination with four Y-TM locations. In all of these 12 cases, the abbreviated instruction would have a common X-TM offset and use one of four Y-TM offsets to select the specific Y-TM location and to provide the needed bits to create the desired instruction. The native program would occupy 12*32=384-bits in a native instruction memory while the abbreviated program would occupy 12*14=168-bits, or less than half the space in an abbreviated instruction memory design.

The MPEG application code was analyzed by a software static analysis tool which:

1. Splits the program code into seven instruction groups, indirect VLIW, flow control, Load, Store, ALU, MAU, and DSU.
2. In each group the unique instructions are identified and counted.
3. The unique instructions are examined based on the appropriate style, and the bit patterns, such as patterns 619 of FIG. 6A. and the number of unique X-TM and Y-TM addressable locations are determined.
4. Based upon the chosen style-fields for each group as defined above and the analysis, the final size of the two TMs is determined for each opcode type.

In this particular example, a 14-bit abbreviated-instruction format was used and the total number of bits was determined for the main instruction memory and compared to the native form as used in the actual MPEG program. A memory savings was then reported. In the following summary reports, a slot is an addressable location in the TM.

VLIW instructions:
 57 Y-TM Slots (covering 628 VLIW instructions used in the 5050 instruction program)
 23 X-TM Slots (covering 628 VLIW instructions used in the 5050 instruction program) (covering 127 UNIQUE instructions)
14-bit Dual-TM Instruction Analysis:
 (Y-TM Slots=57)*(Y-TM Slot-size=6)=342 bits
 (X-TM Slots=23)*(X-TM Slot-size=23)=529 bits
 (Instructions=628)*(14-bit instructions)=8792 bits
 Total Bits for this abbreviated-instruction type=9663 bits
 vs.
 (Instructions=628)*(32-bit instructions)=20096 bits
Memory SAVINGS (14-bit) (20096−9663)/(20096)= 51.92%
FLOW instructions:
 123 Y-TM Slots (covering 804 instructions used in the 5050 instruction program)
 69 X-TM Slots (covering 804 instructions used in the 5050 instruction program) (covering 384 UNIQUE instructions)

14-bit Dual-TM Instruction Analysis:
- (Y-TM Slots=123)*(Y-TM Slot-size=8)=984 bits
- (X-TM Slots=69)*(X-TM Slot-size=21)=1449 bits
- (Instructions=804)*(14-bit instructions)=11256 bits
- Total Bits for this abbreviated-instruction type=13689 bits vs.
- (Instructions=804)*(32-bit instructions)=25728 bits Memory SAVINGS (14-bit) (25728−13689)/(25728):=46.79%

LOAD instructions:
- 138 Y-TM Slots (covering 1326 instructions used in the 5050 instruction program)
- 121 X-TM Slots (covering 1326 instructions used in the 5050 instruction program) (covering 326 UNIQUE instructions)

14-bit Dual-TM Instruction Analysis:
- (Y-TM Slots=138)*(Y-TM Slot-size=10)=1380 bits
- (X-TM Slots=121)*(X-TM Slot-size=18)=2178 bits
- (Instructions=1326)*(14-bit instructions)=18564 bits
- Total Bits for this abbreviated-instruction type=22122 bits vs.
- (Instructions=1326)*(32-bit instructions)=42432 bits Memory SAVINGS (14-bit) (42432−22122)/(42432)=47.86%

STORE instructions:
- 59 Y-TM Slots (covering 604 instructions used in the 5050 instruction program)
- 37 X-TM Slots (covering 604 instructions used in the 5050 instruction program) (covering 182 UNIQUE instructions)

14-bit Dual-TM Instruction Analysis:
- (Y-TM Slots=59)*(Y-TM Slot-size=10)=590 bits
- (X-TM Slots=37)*(X-TM Slot-size=18)=666 bits
- (Instructions=604)*(14-bit instructions)=8456 bits
- Total Bits for this abbreviated-instruction type=9712 bits vs.
- (Instructions=604)*(32-bit instructions)=19328 bits Memory SAVINGS (14-bit) (19328−9712)/(19328)=49.75%

ALU instructions:
- 128 Y-TM Slots (covering 825 instructions used in the 5050 instruction program)
- 92 X-TM Slots (covering 825 instructions used in the 5050 instruction program) (covering 234 UNIQUE instructions)

14-bit Dual-TM Instruction Analysis:
- (Y-TM Slots=128)*(Y-TM Slot-size=10)=1280 bits
- (X-TM Slots=92)*(X-TM Slot-size=17)=1564 bits
- (Instructions=825)*(14-bit instructions)=11550 bits
- Total Bits for this abbreviated-instruction type=14394 bits vs.
- (Instructions=825)*(32-bit instructions)=26400 bits Memory SAVINGS (14-bit) (26400−14394)/(26400)=45.48%

MAU instructions:
- 35 Y-TM Slots (covering 191 instructions used in the 5050 instruction program)
- 23 X-TM Slots (covering 191 instructions used in the 5050 instruction program) (covering 56 UNIQUE instructions)

14-bit Dual-TM Instruction Analysis:
- (Y-TM Slots=35)*(Y-TM Slot-size=10)=350 bits
- (X-TM Slots=23)*(X-TM Slot-size=17)=391 bits
- (Instructions=191)*(14-bit instructions)=2674 bits
- Total Bits for this abbreviated-instruction type=3415 bits vs.
- (Instructions=191)*(32-bit instructions)=6112 bits Memory SAVINGS (14-bit) (6112−3415)/(6112)=44.13%

DSU instructions:
- 119 Y-TM Slots (covering 672 instructions used in the 5050 instruction program)
- 71 X-TM Slots (covering 672 instructions used in the 5050 instruction program) (covering 231 UNIQUE instructions)

14-bit Dual-TM Instruction Analysis:
- (Y-TM Slots=119)*(Y-TM Slot-size=10)=1190 bits
- (X-TM Slots=71)*(X-TM Slot-size=17)=1207 bits
- (Instructions=672)*(14-bit instructions)=9408 bits
- Total Bits for this abbreviated-instruction type=11805 bits vs.
- (Instructions=672)*(32-bit instructions)=21504 bits Memory SAVINGS (14-bit) (21504−11805)/(21504)=45.10%

The overall memory savings for the MPEG decoder example are now described.
- Total native 32-bit instructions=5050
- Total UNIQUE instructions=1540

Overall 14-bit Dual-TM Analysis
- Total bits in Slots and 14-bit instructions=84800 bits
- (VIM Locations=57)*(160 bits)=9120 bits
- Total Bits for all instruction types=93920 bits vs.
- (Instructions=5050)*(32-bit instructions)=161600 bits
- (VIM Locations=57)*(160 bits)=9120 bits
- Total Bits for all instruction types=170720 bits
- System Memory SAVINGS (14-bit) (170720−93920)/(170720)=44.99%

The instruction memory savings by itself is as follows:

Instruction memory Savings (14-bit) (161600−(5050*14))/(161600)=56.25%. It is noted that the addition of Vb and style register management instructions will reduce this percentage slightly. It is further noted that there are additional analysis mechanisms not addressed in this exemplary summary report but which can further reduce instruction memory requirements. For example, for those opcodes with common styles, a search may be done to find the common X-TM and Y-TM entries.

Also, this analysis report did not try more than one style per group. It is very feasible that an additional style or styles can be determined for each style grouping and steps 3 and 4 (in the previous identified analysis tool steps) are repeated to determine whether additional styles further reduce memory requirements.

Guidelines to Develop Application Code for Abbreviated-Instructions:

Exemplary ManArray Abbreviated-Instruction Set guideline rules are:

1. Interactive with the analysis tool, account for the TM Vb base address register and style register management instructions in the initial program. The management instructions in the abbreviated program include loads to the programmer visible control registers in order to change the style and Vb values as necessary. These additional cycles must be accounted for in both the initial native program and the newly created abbreviated-instruction program.

2. After initial analysis for the reduced size program memory is completed, look for very low usage TM locations. These low usage locations point to low usage instructions which it may be possible to eliminate and then reprocess the program. This would further reduce memory needs and reduce the complexity of the end core processor.

3. It is anticipated that grouping the use of compute register file (CRF) registers can be of benefit to reducing the program memory size. The groupings are determined from the style-fields that cover the CRF register specification in the instruction format.

While the present invention has been described in a presently preferred embodiment, it will be recognized that a number of variations will be readily apparent and that the present teachings may be widely applied. By way of example, while instructions with specific numbers of bits and formats are addressed herein, the present invention will be applicable to instructions having other numbers of bits and different formats. Further, while described in the presently preferred context of the ManArray architecture, the invention will also be applicable to other processing architectures.

We claim:

1. A method for generating an abbreviated application specific program utilizing an abbreviated instruction set comprising the steps of:

generating a native program for an application utilizing a set of native instructions having a first fixed number of bits;

debugging the native program;

processing the debugged native program by analyzing the set of native instructions at a sub-instruction level to determine specific patterns of bits that do not change within groups of instructions mid utilizing the results of said analysis to determine an abbreviated instruction set having a second fixed number of bits less than the first fixed number of bits and corresponding to the set of native instructions; and converting the native program to the abbreviated application specific program by replacing the set of native instructions with the abbreviated instruction set.

2. The method of claim 1 wherein said step of processing further comprises:

analyzing the set of native instructions to identify a first group of native instructions having a style pattern of bits which is defined as a specific pattern of bits that are constant for said group.

3. The method of claim 2 further comprising the step of:

storing the identified style pattern of bits in a translation memory.

4. The method of claim 3 further comprising the step of:

utilizing the identified style pattern of bits stored in said translation memory to recreate native instructions from the first group of native instruction by combining bits from corresponding abbreviated instructions with the identified style pattern of bits.

5. The method of claim 1 wherein said step of processing further comprises:

analyzing the set of native instructions to identify multiple groups of native instructions, each group having a style pattern of bits which is defined as a specific pattern of bits that are constant.

6. The method of claim 5 further comprising the step of:

storing the identified style patterns of bits in a translation memory.

7. The method of claim 6 further comprising the step of:

utilizing an identified style pattern of bits selected from said translation memory to recreate native instructions from one of said multiple groups of native instructions by combining bits from corresponding abbreviated instructions with the identified style pattern of bits.

8. The method of claim 4 further comprising the step of:

creating a one-to-one mapping between a program's native instruction and an abbreviated instruction by using a translation memory addressing mechanism to identify the style pattern of bits stored in said translation memory.

9. The method of claim 7 further comprising the step of:

creating a one-to-one mapping between a program's native instruction and an abbreviated instruction by using a translation memory addressing mechanism to identify the style pattern of bits stored in said translation memory.

10. The method of claim 8 further comprising the translation memory addressing step of adding or concatenating an offset field contained in the abbreviated instruction with a translation memory base address stored in an internal machine register to form the address to select a specific pattern of bits from said translation memory.

11. The method of claim 9 further comprising the translation memory addressing step of adding or concatenating an offset field contained in the abbreviated instruction with a translation memory base address stored in an internal machine register to form the address to select a specific pattern of bits from said translation memory.

12. The method of claim 1 further comprising the step of:

executing the application specific program on a simulator to verify its functional equivalence to the native program.

13. The method of claim 12 further comprising the step of:

determining a processor core specification tailored for use in implementing the application specific program utilizing the abbreviated instruction set.

14. The method of claim 1 further comprising the step of executing the application specific program on a Manta-2 based simulator acting as an emulator.

15. The method of claim 1 wherein the native instruction set is a manifold array (ManArray) instruction set.

16. The method of claim 15 further comprising the step of translating abbreviated instructions back into a native ManArray format for decoding and execution in a ManArray sequence processor and processing elements.

17. The method of claim 16 wherein the step of translating abbreviated instructions back is performed only by a sequence processor.

18. A method for generating an abbreviated instruction set corresponding to a set of native manifold array (ManArray) instructions for all application specific program comprising the steps of:

separating the set of native ManArray instructions into groups of instructions;

identifying the unique instructions within each group of instructions;

analyzing the unique instructions for common instruction characteristics;

determining at least one style pattern of bits which is defined as a specific pattern of bits that are constant; and generating the abbreviated instruction set utilizing the at least one style.

19. The method of claim 18 wherein the set of native ManArray instructions are separated into groups by classifying said instructions by opcode.

20. The method of claim 19 wherein at least the following groups are established: store and load instructions; MAU and ALU instructions; DSU instructions; and control flow instructions.

21. The method of claim 19 wherein at least one of the common instruction characteristics is a relative bit-pattern usage in the application specific program for a given bit-pattern split in an abbreviated instruction format.

22. The method of claim 18 further comprising the step of:
    storing the at least one style pattern of bits in a translation memory.

23. The method of claim 22 further comprising the step of analyzing relative bit-pattern usage among groups of instructions that include a common style.

24. The method of claim 22 further comprising the step of generating at least one translation management memory instruction.

25. The method of claim 22 further comprising the step of:
    utilizing the identified style stored in the translation memory to recreate native instructions from a first group of native instruction by combining bits from corresponding abbreviated instructions with the at least one style pattern of bits.

26. A method for translating abbreviated instructions into a native instruction format comprising the steps of:
    fetching an abbreviated instruction having a first fixed number of bits from a memory tailored to storage of abbreviated instructions;
    dynamically translating the abbreviated instruction into the format of a native instruction by using a first bit field in the abbreviated instruction as an address reference to a first translation memory containing at least one specific sub-native instruction pattern of bits;
    fetching a sub-native instruction pattern from the translation memory using said address reference, said sub-native instruction pattern being based on a previous analysis of the set of native instructions on a sub-instruction level to determine patterns of bits that do not change within groups of instructions;
    combining the sub-native instruction patterns with bits from the abbreviated instruction to create the native instruction in a sequence processor (SP) array controller said native instruction having a second fixed number of bits greater than said first fixed number; and
    dispatching the native instruction to the sequence processor array controller or a processing element for execution.

27. The method of claim 26 wherein the abbreviated instruction includes at least one S/P bit, a multi-bit opcode field and a multi-bit translation memory address offset.

28. The method of claim 27 wherein the step of dynamically translating further comprises the step of decoding the multi-bit opcode field.

29. The method of claim 27 wherein the step of dynamically translating further comprises the steps of forming a translation memory address by adding the multi-bit translation memory address offset with a translation memory base address; and
    selecting a plurality of native instruction bits from a location in the translation memory corresponding to the formed translation memory address.

30. The method of claim 27 further comprising the step of directly using the multi-bit translation memory address offset to select a plurality of native instruction bits from a location in a translation memory corresponding to the multi-bit translation memory address offset.

31. The method of claim 26 wherein the abbreviated instruction includes at least one S/P bit, a multi-bit opcode field, a multi-bit translation memory address offset, and a plurality of bits which are to be directly loaded.

32. The method of claim 31 wherein the step of dynamically translating further comprises the step of decoding the multi-bit opcode field.

33. The method of claim 31 wherein the step of dynamically translating further comprises the steps of forming a translation memory address by adding the multi-bit translation memory offset with a translation memory base address; and
    selecting a plurality of native instruction bits from a location in the translation memory corresponding to the formed translation memory address.

34. The method of claim 33 wherein the step of dynamically translating further comprises the step of combining the selected plurality of native instruction bits and the plurality of bits which are to be directly entered.

35. The method of claim 26 wherein the abbreviated instruction includes at least one S/P bit, a multi-bit opcode field, a first multi-bit translation memory offset field and a second multi-bit translation memory offset field.

36. The method of claim 35 wherein the step of dynamically translating further comprises the step of decoding the multi-bit opcode field.

37. The method of claim 35 wherein the step of dynamically translating further comprises the steps of:
    selecting a first multi-bit portion of the native instruction from a first translation memory address utilizing the first multi-bit translation memory offset field; and
    selecting a second multi-bit portion of the native instruction from a second translation memory address utilizing the second multi-bit translation memory offset field; and
    combining both multi-bit portions into a native instruction format.

38. The method of claim 37 wherein translation memory addresses are formed by concatenating base address register bits and translation memory offset field bits.

39. A system for translating abbreviated instructions into a native instruction format comprising:
    a memory storing an abbreviated instruction having a first fixed number of hits;
    means for fetching the abbreviated instruction from the memory;
    means for dynamically translating the abbreviated instruction into a native instruction using a translation memory storing at least one specific sub-native instruction pattern of bits, said sub-native instruction pattern being based on a previous analysis of the set of native instructions on a sub-instruction level to determine patterns of bits that do not change within groups of instructions;
    an addressing mechanism using a first bit field in the abbreviated instruction as an address reference to the translation memory;
    means for fetching the sub-native instruction pattern from the translation memory; and
    means for combining the sub-native instruction pattern with bits from the abbreviated instruction to create the native instruction in the native instruction format having a second fixed number of bits greater than said first fixed number.

40. The system of claim 39 further comprising means for dispatching the native instruction to at least one processing element for execution.

41. The system of claim 39 wherein the means for dynamically translating further comprises at least one translation memory for storing style pattern bits which are common to a group of native instructions.

42. A method fur translating abbreviated instructions into a native instruction format comprising the steps of:

fetching an abbreviated instruction having a first fixed number of bits from a memory tailored to storage of abbreviated instructions;

dynamically translating the abbreviated instruction into the format of a native instruction by using a first and a second bit field in the abbreviated instruction as address references to a first field and a second translation memory each containing at least one specific sub-native instruction patterns of bits;

fetching a sub-native instruction pattern from each translation memory using said address references, each said sub-native instruction pattern being based on a previous analysis of the set of native instructions on a sub-instruction level to determine patterns of bits that do not change within groups of instructions;

combining the two sub-native instruction patterns to create the native instruction in a sequence processor (SP) array controller said native instruction having a second fixed number of bits greater than said first fixed number; and dispatching the native instruction to the sequence processor array controller or a processing element for execution.

43. A system for translating abbreviated instructions into a native instruction format comprising:

a memory storing an abbreviated instruction having a first fixed number of bits;

means for fetching the abbreviated instruction from the memory;

means for dynamically translating the abbreviated instruction into a native instruction using two translation memories each storing at least one specific sub-native instruction patterns of bits, each of said sub-native instruction patterns being based on a previous analysis of the set of native instructions on a sub-instruction level to determine patterns of bits that do not change within groups of instructions;

two addressing mechanisms each using a bit field in the abbreviated instruction as an address reference to one of the two translation memories;

means for fetching the sub-native instruction patterns from each translation memory; and means for combining the sub-native instruction patterns to crate the native instruction in the native instruction format having a second fixed number of bits greater than said first fixed number.

* * * * *